(12) United States Patent
Horii

(10) Patent No.: US 8,320,145 B2
(45) Date of Patent: Nov. 27, 2012

(54) SWITCHING POWER SOURCE DEVICE AND DRIVE METHOD THEREOF

(75) Inventor: Kazuhiro Horii, Toyama (JP)

(73) Assignee: Cosel Co., Ltd., Toyama-shi (JP)

( * ) Notice: Subject to any disclaimer, the term of this patent is extended or adjusted under 35 U.S.C. 154(b) by 439 days.

(21) Appl. No.: 12/677,707

(22) PCT Filed: Nov. 26, 2008

(86) PCT No.: PCT/JP2008/071432
§ 371 (c)(1),
(2), (4) Date: Mar. 11, 2010

(87) PCT Pub. No.: WO2009/069647
PCT Pub. Date: Jun. 4, 2009

(65) Prior Publication Data
US 2010/0208502 A1   Aug. 19, 2010

(30) Foreign Application Priority Data
Nov. 30, 2007  (JP) ................................. 2007-310205

(51) Int. Cl.
*H02M 3/24* (2006.01)

(52) U.S. Cl. .......................................... 363/89; 323/222

(58) Field of Classification Search .................. 323/222, 323/207, 266, 271, 272, 282–290; 363/17, 363/20, 21.16, 21.18, 21.12, 21.13, 89, 127
See application file for complete search history.

(56) References Cited

U.S. PATENT DOCUMENTS

| 4,819,121 | A * | 4/1989 | Saito et al. ....................... 361/85 |
| 6,137,267 | A * | 10/2000 | Kates et al. .................... 320/136 |
| 7,193,872 | B2 * | 3/2007 | Siri ................................. 363/95 |
| 7,259,972 | B2 * | 8/2007 | Yang ........................... 363/21.16 |
| 2006/0098463 | A1 | 5/2006 | Baurle et al. | |
| 2007/0229052 | A1 | 10/2007 | Baurle et al. | |

FOREIGN PATENT DOCUMENTS

| JP | 10-052032 A | 2/1998 |
| JP | 2000-014144 A | 1/2000 |
| JP | 2001-119933 A | 4/2001 |
| JP | 2006-136193 A | 5/2006 |

OTHER PUBLICATIONS

International Preliminary Report on Patentability dated Jun. 10, 2010 (and English translation thereof) issued in counterpart International Application No. PCT/JP2008/071432. English Language International Search Report dated Jan. 27, 2009 issued in parent Appln. No. PCT/JP2008/071432.

* cited by examiner

*Primary Examiner* — Rajnikant Patel

(74) *Attorney, Agent, or Firm* — Holtz, Holtz, Goodman & Chick, PC

(57) ABSTRACT

A switching power source device includes current control pulse generating means configured of a target value setting module, which outputs a changeable value which is a predetermined target value relating to a control of an output current, a computing module, which carries out a computing process relating to the control of the output current based on the target value, and outputs a computation result, and a pulse generating module, which generates a current control pulse voltage for controlling the output current based on the computation result. The switching power source device includes a current detecting circuit, which detects the output current or a current flowing in a switching element TR1, and a current limit signal generating circuit which, when the detected current exceeds a reference value set based on the output of the current control pulse generating means, outputs a current limit signal for limiting the current. A drive pulse generating circuit, on the current limit signal being output, operates in such a way that an on-duty of a drive pulse stops widening, or becomes narrower.

12 Claims, 12 Drawing Sheets

SWITCHING POWER SOURCE DEVICE AND DRIVE METHOD THEREOF This application is a U.S. National Phase Application under 35 USC 371 of International Application PCT/JP2008/071432 filed Nov. 26, 2008.

TECHNICAL FIELD

The present invention relates to a switching power source device which carries out a control of a switching operation with a pulse width modulation signal, converts a direct current voltage to a desired voltage, and supplies power to an electronic instrument, or the like, and relates in particular to a switching power source device, and drive method thereof, which control an output current with a digital control.

BACKGROUND ART

A general switching power source device is provided with an overcurrent protection circuit which limits its supply capacity so that there is no flow of an output current exceeding a predetermined value. The object of this is, as well as preventing an electronic instrument, or the like, from overheating or burning out due to an excessive current continuing to flow when the electronic instrument, or the like, which is a load connected to an output, breaks down due to low impedance, to prevent a breakdown, overheating, or burn out of the switching power source device itself.

Meanwhile, among the various kinds of electronic instrument which form the load of the switching power source device, in the case of an instrument including electromagnetic drive system parts such as a motor and relay, or an instrument in which, being an electronic circuit including digital elements such as a CPU, a DSP, and an FPGA, a current flows at a uniform timing, there are those in which, although not a breakdown of the instrument, a large current (hereafter, a peak current) flows for an extremely short time. In this kind of case, provided that it is for a short time, it is possible to safely supply this kind of peak current, even with a switching power source device configured of small, low-capacity power parts. Then, for example, an allowable, predetermined setting value (hereafter, an overcurrent setting value), which is a value exceeding a peak current value necessary for a normal operation of the load, being set as an upper limit value of the output current, there has been put into practical use a peak overcurrent protection circuit, or the like, which carries out an operation wherein it monitors a duration time of the peak current with a timer circuit configured of a capacitor, a resistor, and the like, and, in the event that the time exceeds a predetermined setting time, changes the overcurrent setting value to a small value.

Generally, it is often the case that the heretofore described kind of overcurrent protection circuit is an analog control type configured of discrete parts. Consequently, for example, in order to provide it with a function which adjusts its control characteristic to a control characteristic such as the overcurrent setting value in line with an operational condition of the electronic instrument, or the like, there is a need for complicated circuits which carry out various signal processes. Furthermore, it being unavoidable to configure the circuits with a large number of discrete parts, not only are an evaluation of the circuit operations and other aspects of management troublesome, but also, due to an increase in the number of parts, it is one cause of a hindering of a miniaturization and cost reduction of the switching power source device.

Meanwhile, an overcurrent protection circuit using a digital control can easily carry out an adjustment or switching of the control characteristics by embedding the complicated signal process in a computing program, and has a superior intelligence. For example, as disclosed in Patent Document 1, there has been proposed a switching power source device overcurrent protection circuit which includes a current detecting resistor, which converts an output current supplied to a load into a voltage signal, an analog/digital converter (hereafter called an A/D converter), which converts the voltage signal into a digital value, computing means which determines, based on the digital value, whether or not the output current is in an overcurrent condition exceeding an overcurrent setting value, and pulse width varying means which, when it is determined that there is an overcurrent condition, carries out a process of compulsorily shortening a pulse width of a switching element. The computing means and pulse width varying means are configured using a digital processor. The digital processor, being one which includes an addition and subtraction function, a multiplication and division function, a comparison function, a timer function, a storage function, and the like, can store various setting values or target values set from the exterior, using a storage function such as a memory or register.

Furthermore, in the heretofore described switching power source device, a first setting value, and a second setting value lower than the first setting value, being given as overcurrent setting values, the output current is limited based on the first setting value when first reaching the overcurrent condition, and limited based on the second setting value after a predetermined time elapses. Specifically, a comparison of the digital value of the output current, and the first setting value and second setting value, is computed by the comparison function of the digital processor, and when it is determined, as a result of the computation, that the digital value has exceeded the first setting value, the pulse width is compulsorily made narrower. Furthermore, a control is such that, even when the digital value has not exceeded the first setting value, when it is determined that a condition of exceeding the second setting value has continued for a predetermined time or longer, the pulse width is compulsorily made narrower.

Patent Document 1: JP-A-2001-119933

DISCLOSURE OF THE INVENTION

However, with the overcurrent protection circuit disclosed in Patent Document 1, when mounting it in a current, practical switching power source device, there is a problem in that in order to obtain control characteristics which enable a high-speed response to a precipitous increase in the output current, a high-cost digital processor which operates with a high-speed clock is necessary.

Generally, in order to avoid a breakdown of a power semiconductor, or the like, inside the switching power source device, the control of the overcurrent protection circuit has to be one which responds in a short time to one cycle of a switching operation. It is often the case that a current general purpose switching power source device, with a view to a miniaturization, or the like, of magnetic parts, or the like, is set to a switching frequency of 500 kHz or more. For example, in the case of setting the switching frequency at 500 kHz, a response delay time of a typical analog control IC overcurrent protection circuit being set at 130 nsec, a control characteristic which can respond in 130 nsec or less with respect to 2 µsec, which is one cycle of the switching operation, is required in order to obtain an equivalent response speed.

However, in the flow of the digital control of the overcurrent protection circuit of the switching power source device disclosed in Patent Document 1, it can be considered that a total of around 100 clocks of processing are necessary; around 50 clocks for a process of loading the digital value of the output current obtained via the current detecting resistor and A/D converter into the digital processor, and around 50 clocks for a process of determining with a computing process, based on the digital value, whether or not there is an overcurrent condition exceeding the overcurrent setting value, determining that there is an overcurrent condition, and controlling and compulsorily turning off the switching element. In order to complete the 100 clocks of processing in a period of 130 nsec, as heretofore described, a digital processor clock frequency of approximately 769 MHz, the value of the 100 clocks of processing divided by 130 nsec, is necessary. Also, as the digital processor also carries out a variety of computing processes apart from the heretofore described control of the overcurrent protection, in actual practice an even higher clock frequency is necessary. That is, in order to obtain an overcurrent protection circuit including a high-speed responsiveness equivalent to that of the analog control, there is a need for a digital processor capable of a high-speed signal process, including a clock frequency a few digits or more higher than the switching frequency of a switching power source circuit.

A high-performance digital processor which operates at a high speed in this way is extremely expensive. Consequently, there is a cost-related problem in employing a digital control in a general purpose switching power source device, which is hindering the spread of a digital control switching power source device with excellent intelligence.

Also, the control characteristics of the overcurrent setting value, peak overcurrent protection circuit setting time, and the like, fluctuate due to an individual difference in characteristics belonging to each part configuring the power source circuit, a fluctuation of part characteristics due to temperature, a change in an output current detection accuracy due to a fluctuation in an input voltage or output voltage, or the like.

When the overcurrent setting value (the limit value of the output current) is set on the high side, or the limit time on the long side, the electronic instrument, or the like, being unable to sufficiently implement the protection function preventing an overheating or burnout when falling into the overcurrent condition due to a breakdown of the load electronic instrument, or the like, the danger of a breakdown, or the like, occurring simultaneously in the switching power source too increases. For example, in order to ensure the safety of the switching power source device itself, the power source circuit has to be configured using large power parts with leeway in a rated current and rated temperature with respect to the actual limit value of the output current, in order to avoid a breakdown, overheating, or burnout. Consequently, this is one cause of the hindering of the miniaturization and cost reduction of the switching power source device.

The invention, being contrived bearing in mind the heretofore described background art, has an object of providing a switching power source device, and drive method thereof, which has a superior intelligence, has a high-speed responsiveness of a level equivalent to or higher than an analog control, even while using a comparatively low-cost general purpose digital processor, or the like, and also includes a digital control overcurrent protection function which can obtain a highly accurate overcurrent protection characteristic.

The invention according to claim 1, being a switching power source device including a drive pulse generating circuit which outputs a drive pulse whose pulse width is modulated at a predetermined switching frequency, an inverter circuit having a switching element such as a MOS-FET which turns on and off a direct current input voltage in accordance with a drive pulse from the drive pulse generating circuit, generating an alternating current voltage, and a rectification and smoothing circuit which rectifies and smoothes the alternating current voltage, generates an output voltage, and supplies an output current to a load, includes current control pulse generating means configured of a target value setting module which outputs a value which, being a predetermined target value relating to a control of the output current, can be changed, a computing module which carries out a computing process relating to the control of the output current based on the target value, and outputs a result of the computation, and a pulse generating module which generates a current control pulse voltage for controlling the output current based on the computation result. Furthermore, the switching power source device including a current detecting circuit which detects the output current from the rectification and smoothing circuit or a current flowing in the switching element, and a current limit signal generating circuit which, when the current detected by the current detecting circuit exceeds a reference value set based on the output of the current control pulse generating means, outputs a current limit signal for limiting the current, the drive pulse generating circuit, on the current limit signal being output, operates in such a way that an on-duty of the drive pulse driving the switching element stops widening, or becomes narrower.

The invention according to claim 2 is a switching power source device, wherein the current control pulse generating means is configured of a digital processor configured in such a way that the current control pulse voltage can be output as a signal whose pulse width has been modulated, a pulse smoothing circuit which smoothes the current control pulse voltage, generating a smoothed voltage, is connected, the current detecting circuit detects the output current or the current flowing in the switching element, and outputs a current detecting voltage based thereon, the current limit signal generating circuit, having a comparison circuit which compares a reference voltage determined based on the smoothed voltage and the current detecting voltage, outputs the current limit signal when the current detecting voltage exceeds the reference voltage, and the drive pulse generating circuit, on the current limit signal being output, operates in such a way that the on-duty of the drive pulse driving the switching element stops widening, or becomes narrower.

The invention according to claim 3 is a switching power source device, wherein the current limit signal generating circuit includes a first resistor, of which one end is connected to an output of the pulse smoothing circuit, a second resistor, of which one end is connected to the other end of the first resistor, a first NPN transistor, whose collector terminal is connected to the other end of the second resistor, whose base terminal is connected to a midpoint of the first resistor and second resistor, and whose emitter terminal is connected to one end of the current detecting circuit output, a second NPN transistor, whose base terminal is connected to the collector of the first NPN transistor, whose emitter terminal is connected to the other end of the current detecting circuit output, and whose collector terminal is an output of the current limit signal generating circuit. One of the emitter terminals of the first and second NPN transistors is connected to a ground potential, and in the current detecting circuit, when the output current of the rectification and smoothing circuit flows, or when a current flows in the switching element, the current detecting voltage is output in a direction such that the emitter terminal of the second NPN transistor has a lower potential than the emitter terminal of the first NPN transistor.

The invention according to claim 4 is a switching power source device including current limit operating time monitoring means which, in the event that a condition in which the current limit signal is continuously generated by the current limit signal generating circuit, or repeatedly generated for each switching frequency, continues for a predetermined time or longer, outputs a time expiration signal, wherein the target value setting module of the current control pulse generating means, based on the time expiration signal of the current limit operating time monitoring means, determines the target value in such a way that the current detected by the current detecting circuit is further limited by the current limit signal of the current limit signal generating circuit, and outputs it to the computing module, and the current control pulse voltage computed in the computing module based on the target value is output from the pulse generating module.

The invention according to claim 5 is a switching power source device, wherein the computing module of the current control pulse generating means calculates a time ratio of the current control pulse voltage based on the target value output by the target value setting module, the pulse generating module is configured in such a way as to generate a rectangular wave of a constant frequency having a high level and low level voltage of the time ratio calculated by the computing module, the pulse smoothing circuit includes a resistor of which one end is connected to an output of the current control pulse generating means, and a capacitor connected between the other end of the resistor and a ground, and both end voltages of the capacitor form outputs of the pulse smoothing circuit.

The invention according to claim 6 is a switching power source device, wherein the computing module of the current control pulse generating means calculates the time ratio of the current control pulse voltage based on the target value output by the target value setting module, the pulse generating module is configured in such a way as to alternate between the high level of the time ratio calculated by the computing module and a floating level output condition in a constant cycle, the pulse smoothing circuit includes a resistor of which one end is connected to the output of the current control pulse generating means, a capacitor connected between the other end of the resistor and a ground, and a discharge path connected in parallel to the capacitor, and both end voltages of the capacitor form outputs of the pulse smoothing circuit. Also, the discharge path connected in parallel to the capacitor is an input impedance of the current signal generating circuit.

The invention according to claim 7 is a switching power source device, wherein the pulse smoothing circuit includes a first resistor of which one end is connected to the output of the current control pulse generating means, a capacitor connected between the other end of the resistor and a ground, at both ends of which an output voltage of the pulse smoothing circuit is generated, a discharge path connected in parallel to the capacitor, and a series circuit of a diode and second resistor connected so as to be able to cause a current to flow from a contact point of the capacitor and first resistor toward the output of the current control pulse generating means. The computing module of the current control pulse generating means, on the target value determined based on the operating time expiration signal being given, controls the output condition of the pulse generating module at the low level for a predetermined time, and the voltage of the capacitor of the pulse smoothing circuit is discharged via the series circuit of the diode and second resistor.

The invention according to claim 8 is a switching power source device, including an error amplification circuit which compares the output voltage of the switching power source device with a predetermined target value, and outputs an inversely amplified output voltage control signal, wherein the current limit signal generating circuit includes a comparison circuit which compares the reference voltage determined based on the smoothing voltage and the current detecting voltage, and outputs a current limit signal which differs between when the current detecting voltage exceeds the reference voltage and a case other than this, the drive pulse generating circuit includes a sawtooth wave generating circuit, which generates a sawtooth wave voltage driven by the switching frequency, a comparator into whose first input terminal the sawtooth wave voltage is input, which compares the output voltage control signal input into a second input terminal and the sawtooth wave voltage, and outputs a signal which differs between a period in which the sawtooth wave voltage is low and a period other than this, and a signal selection circuit into which the current limit signal is input. The signal selection circuit carries out an operation of selecting the output signal in such a way that a drive pulse of the time ratio determined based on the current limit signal is output from the drive pulse generating circuit when the current limit signal is continuously generated by the current limit signal generating circuit, or repeatedly generated for each switching frequency, and a drive pulse of the time ratio determined based on the output voltage control signal is output from the drive pulse generating circuit when the current limit signal is not output.

The invention according to claim 9 is a switching power source device, including temperature detecting means which detects an ambient temperature of the switching power source device with a temperature-sensitive element, and outputs a temperature signal based thereon, wherein the target value setting module of the current control pulse generating means determines the target value based on the temperature signal, and outputs the determined target value to the computing module.

The invention according to claim 10 is a switching power source device, including input voltage detecting means which detects an input voltage of the switching power source device, and outputs an input voltage signal based thereon, wherein the target value setting module of the current control pulse generating means determines the target value based on the input voltage signal, and gives the determined target value to the computing module.

The invention according to claim 11 is a switching power source device, including output voltage detecting means which detects an output voltage of the switching power source device, and outputs an output voltage signal based thereon, wherein the target value setting module of the current control pulse generating means determines the target value based on the output voltage signal, and gives the determined target value to the computing module.

The invention according to claim 12 is a drive method of a switching power source device, the switching power source device including a drive pulse generating circuit which outputs a drive pulse whose pulse width is modulated at a predetermined switching frequency, an inverter circuit having a switching element which turns on and off a direct current input voltage in accordance with a drive pulse from the drive pulse generating circuit, generating an alternating current voltage, a rectification and smoothing circuit which rectifies and smoothes the alternating current voltage, generates an output voltage, and supplies an output current to a load, a target value setting module which outputs a value which, being a predetermined target value relating to a control of the output current, can be changed, a computing module which carries out a computing process relating to the control of the output current based on the target value, and outputs a result of the computation, a pulse generating module which generates a current control pulse voltage for controlling the output current based on the computation result, a current detecting circuit which detects the output current of the rectification and smoothing circuit or a current flowing in the switching element, and a current limit signal generating circuit which, when the current detected by the current detecting circuit exceeds a reference value, outputs a current limit signal for limiting the current, wherein the drive pulse generating circuit, on the current limit signal being output, operates in such a way that an on-duty of the drive pulse stops widening, or becomes narrower. The drive method includes a power source start-up step of supplying a predetermined direct current voltage to an input of the switching power source device, thus starting it up, a load setting step of connecting a load to an output, and causing an output current equivalent to a desired overcurrent setting value to be output, a target value varying step of continuously changing the target value to be output to the computing module by adjusting a predetermined fixed coefficient set in a computing program of the target value setting module included in the current control pulse generating means, a boundary value extraction step of extracting a fixed coefficient boundary value at a boundary point between a condition in which the output voltage continuously changes in response to the change of the target value, in a condition in which the output current is of the overcurrent setting value, and a condition in which the output voltage is held at a constant value, and a boundary value storage step of storing the fixed coefficient boundary value as a setting value of the fixed coefficient in the computing program.

According to the switching power source device of the invention, it is possible to realize a digital control overcurrent protection circuit with superior intelligence which can respond at a high speed, using a low-cost digital processor with a comparatively low-speed clock. In particular, it is also possible to carry out an optimum overcurrent protection control in response to a fluctuation of an external temperature, input voltage, output voltage, and the like. Furthermore, it being possible to automatically adjust the overcurrent protection characteristics in line with an individual difference in the characteristics of the discrete parts, and the like, configuring the switching power source device, and with a usage condition of the switching power source device, it is possible to ensure the safety of the load electronic instrument, and of the switching power source device itself. Then, it is possible to provide a small, low-cost switching power source device.

Also, according to the drive method of the switching power source device of the invention, it is possible to programatically adjust the overcurrent protection characteristics in line with an individual difference in the characteristics of the discrete parts, and the like, configuring the switching power source device, setting them to an optimum condition. Furthermore, it being possible reduce processes such as a resistance value adjustment or part replacement, the overcurrent protection and safety of the load electronic instrument, and of the switching power source device itself, are ensured with a simple circuit configuration, enabling a stable power source drive.

Figure 1:
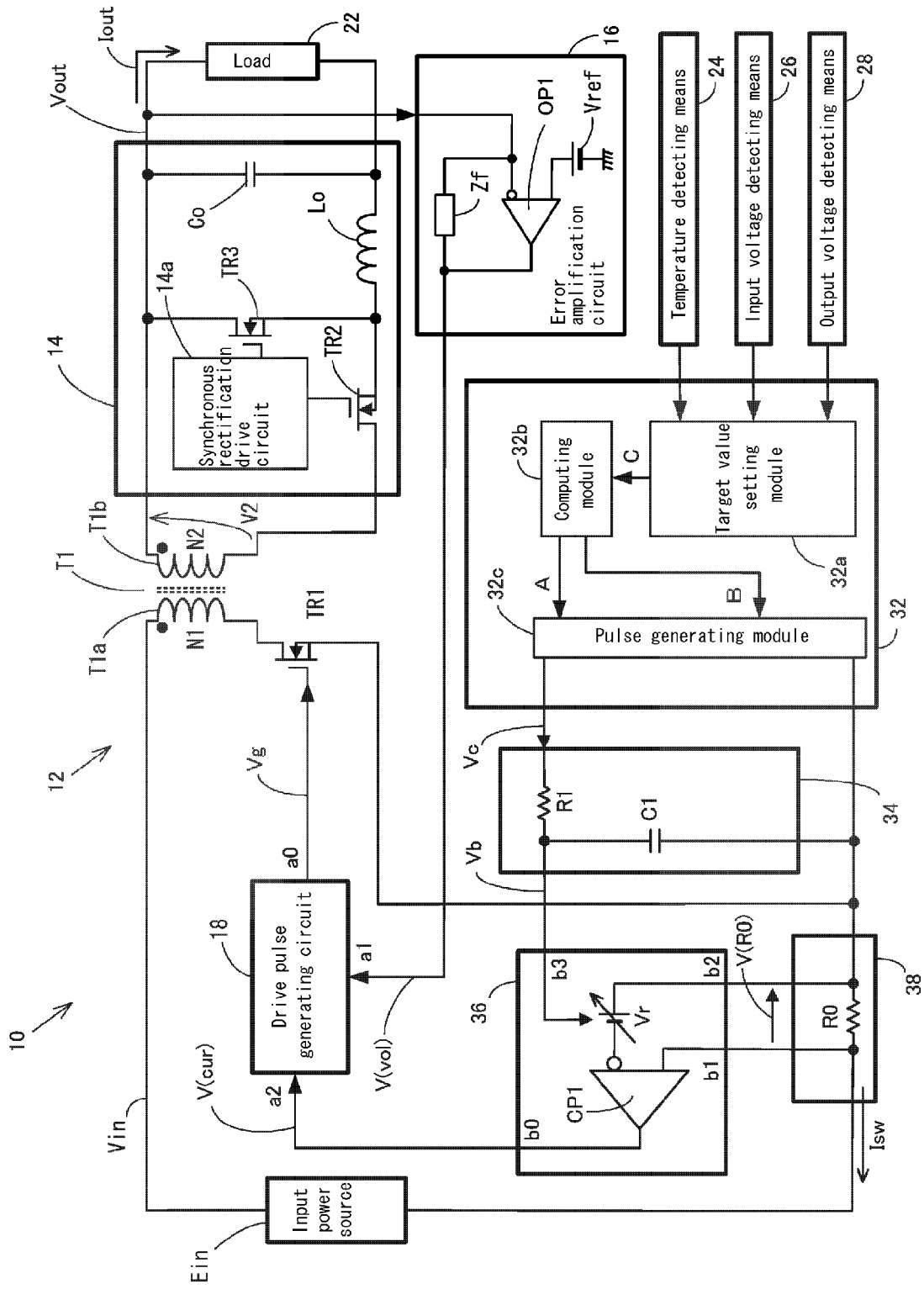
[FIG. 1] A block diagram showing a first embodiment of a switching power source device of the invention.
Figure 2:
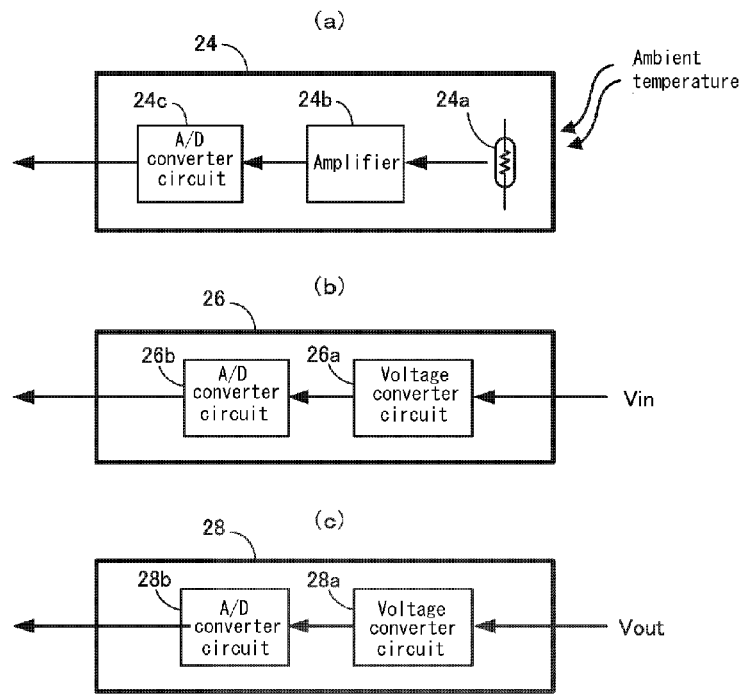
[FIG. 2] A functional block diagram showing embodiments of temperature detecting means (a), input voltage detecting means (b), and output voltage detecting means (c) included in the first embodiment of the switching power source device of the invention.

10, 50 Switching power source device
12 Inverter circuit
16, 64 Error amplification circuit
18, 62 Drive pulse generating circuit
24 Temperature detecting means
26 Input voltage detecting means
28 Output voltage detecting means
32, 54 Current control pulse generating means
32a Target value setting module
32b Computing module
32c, 54c Pulse generating module
34, 56 Pulse smoothing circuit
36, 58 Current limit signal generating circuit
38, 60 Current detecting circuit

BEST MODE FOR CARRYING OUT THE INVENTION

Hereafter, a description will be given, based on FIGS. 1 to 6, of a first embodiment of a switching power source device of the invention. Firstly, a description will be given of an outline, based on the overall circuit diagram shown in FIG. 1. A switching power source device 10 includes an inverter circuit 12 to which a direct current input power source Ein is connected, and which generates an alternating current voltage V2 in accordance with an on-off operation of a switching element TR1, and a rectification and smoothing circuit 14 which rectifies and smoothes the alternating current voltage V2, generating an output voltage Vout, and an output voltage Vout terminal is connected to a load 22. The output voltage Vout is connected to an error amplification circuit 16 configured of an inverting amplifier which outputs an output voltage control signal V(vol), wherein a difference between the output voltage Vout and a predetermined reference voltage Vref is amplified. Furthermore, the switching power source device 10 is equipped with a drive pulse generating circuit 18 which carries out a pulse width modulation in accordance with the output voltage control signal V(vol) output from the error amplification circuit 16, and outputs a drive pulse Vg toward a drive terminal of the switching element TR1.

Also, temperature detection means 24, which detects an ambient temperature of the switching power source device 10 and outputs a temperature signal, input voltage detection means 26, which detects an input voltage and outputs an input voltage signal, and output voltage detection means 28, which detects an output voltage and outputs an output voltage signal, are each connected to current control pulse generating means 32.

The current control pulse generating means 32, being configured of a digital processor, or the like, includes a target value setting module 32a, which determines a target value based on the temperature signal, input voltage signal, and output voltage signal, a computing module 32b, which carries out a computing process based on the target value, and a pulse generating module 32c which, based on a result of the computation, outputs a current control pulse voltage Vc for controlling an output current. The output of the pulse generating module 32c is connected to an input of a pulse smoothing circuit 34, which is an integrated circuit configured of a resistor R1 and capacitor C1. Then, a smoothing voltage Vb being generated at either end of the capacitor C1, an output of the pulse smoothing circuit 34 is connected to a current limit signal generating circuit 36, to be described hereafter.

Also, a current detecting circuit 38, which is a current detecting resistor R0, being inserted between a source terminal of the switching element TR1 and a minus terminal of the input power source Ein, a voltage according to a switching current Isw flowing in the current detecting resistor R0 is generated at either end thereof. Then, both ends of the current detecting resistor R0 are connected to the current limit signal generating circuit 36 as outputs of the current detecting circuit 38.

The current limit signal generating circuit 36, being an overcurrent protection circuit of the switching power source device 10, includes a reference voltage Vr, determined based on the smoothing voltage Vb, and a comparator CP1, which is a comparison circuit which compares the reference voltage Vr and a voltage V(R0) generated at either end of the current detecting resistor R0, and outputs a current limit signal V(cur). When a voltage detected corresponding to a current of the current detecting resistor R0 of the current detecting circuit 38 exceeds the reference voltage Vr, which is a reference value set based on the output of the pulse generating module 32c of the current control pulse generating means 32, the output of the comparator CP1 is output as a current limit signal for limiting the current. The output is connected to the drive pulse generating circuit 18 as the output of the current limit signal generating circuit 36. The drive pulse generating circuit 18 being a circuit which carries out a pulse width modulation based on the input current limit signal V(cur), and outputs the drive pulse Vg of the switching element TR1, its output is connected to the drive terminal of the switching element TR1.

Next, based on FIGS. 1 to 6, a detailed description will be given of a configuration and operation of each circuit block of the switching power source device 10. The inverter circuit 12 being such that, as shown in FIG. 1, a primary side coil T1a of a transformer T1, and the switching element TR1, are connected in series with the input power source Ein, the alternating current voltage V2 is generated in a secondary side coil T1b of the transformer T1 by the on-off operation of the switching element TR1. A polarity and the like of each coil of the transformer T1 is configured of a heretofore known single forward type.

The rectification and smoothing circuit 14 being connected to the secondary side coil T1b of the transformer T1, it is configured of a forward side rectification element TR2, which is rendered conductive, and allows a pulse current to flow therethrough when the switching element TR1 is on, a flywheel side rectification element TR3, which turns on and off complementarily to the forward side rectification element TR2, a synchronous rectification drive circuit 14a, which drives each of the rectification elements TR2 and TR3 in synchronization with the on-off operation of the switching element TR1, and a smoothing circuit configured of a choke coil Lo and capacitor Co. Then, the rectification and smoothing circuit 14 rectifies and smoothes the voltage induced in the secondary side coil T1b, and outputs the output voltage Vout. The load 22 being connected, the output voltage Vout and an output current Tout are supplied to either end of the capacitor Co.

The error amplification circuit 16, including an operational amplifier OP1, into whose inverting input terminal an output voltage analog signal is input, the predetermined reference voltage Vref connected to a non-inverting input of the operational amplifier OP1, and a feedback element Zf for a gain adjustment and phase compensation, as shown in FIG. 1, is an inverting amplification circuit which outputs the output voltage control signal V(vol). Consequently, the output voltage control signal V(vol), being one in which the difference between the output voltage and reference voltage Vref is amplified, drops continuously in the event that the output voltage is higher than the reference voltage Vref, and rises continuously in the opposite case.

The temperature detection means 24, as shown in FIG. 2(a), includes a thermistor 24a, which is a resistance value changing type of temperature-sensitive element, an amplifier 24b, which converts a resistance value of the thermistor 24a into an analog voltage signal, and an A/D converter circuit 24c, which converts the analog voltage signal into a temperature signal, which is a digital signal, and outputs it. The thermistor 24a, being mounted on a printed substrate inside the switching power source device, measures the temperature on the printed substrate.

The input voltage detection means 26, as shown in FIG. 2(b), includes a voltage converter circuit 26a, which monitors an input voltage Vin, and converts the input voltage Vin into a predetermined analog voltage, and an A/D converter circuit 26b, which converts the analog voltage into an input voltage signal, which is a digital signal, and outputs it. The voltage converter circuit 26a is appropriately set as a voltage divider circuit which resistively divides the input voltage Vin, a circuit which converts a voltage generated in a third coil provided in the transformer T1 into a voltage proportional to the input voltage, or the like. Herein, a circuit which indirectly monitors the input voltage Vin, as in the latter example, is also acceptable.

The output voltage detection means 28, as shown in FIG. 2(c), includes a voltage converter circuit 28a, which monitors the output voltage Vout, and converts the output voltage Vout into a predetermined analog voltage, and an A/D converter circuit 28b, which converts the analog voltage into an output voltage signal, which is a digital signal, and outputs it. The voltage converter circuit 28a is appropriately set as a voltage divider circuit which resistively divides the output voltage Vout, a circuit which converts a voltage generated in a third coil provided in the transformer T1 into a voltage proportional to the output voltage, or the like. Herein, a circuit which indirectly monitors the output voltage Vout, as in the latter example, is also acceptable.

The current control pulse generating means 32 is configured using, for example, a general-purpose digital processor (a microcomputer). The current control pulse generating means 32 includes the target value setting module 32a, computing module 32b, and pulse generating module 32c, as shown in FIG. 1. The target value setting module 32a outputs a target value C toward the computing module 32b, based on the heretofore described temperature signal, input voltage signal, and output voltage signal. When there is no input from the exterior of the temperature signal, input voltage signal, output voltage signal, and the like, the target value setting module 32a determines the target value C based on a temperature signal default value, input voltage signal default value, and output voltage signal default value fixedly stored in advance.

The computing module 32b carries out a computing process based on the target value C, determines a set value B, and outputs the set value B, and a set value A fixedly set in advance, toward the pulse generating module 32c.

Figure 3:
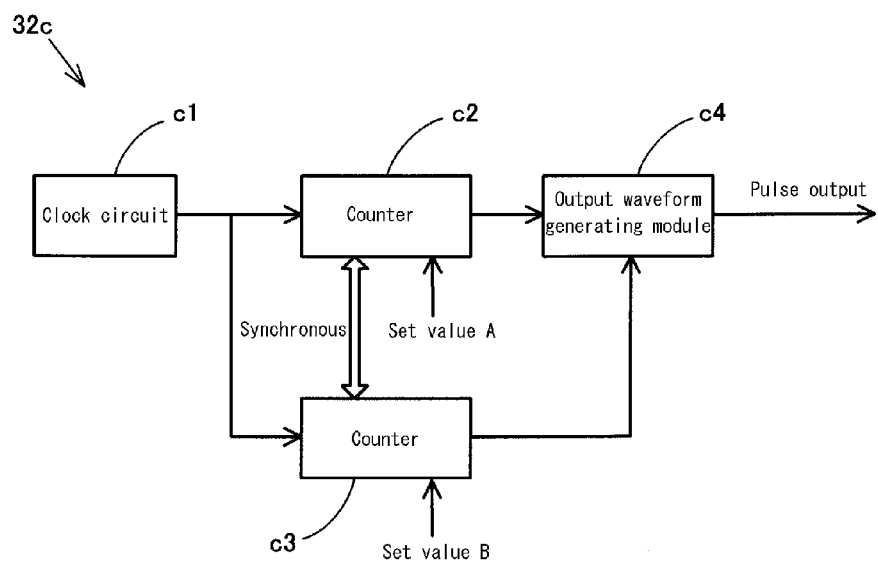
[FIG. 3] A functional block diagram of a pulse generating module included in the first embodiment of the switching power source device of the invention.
Figure 4:
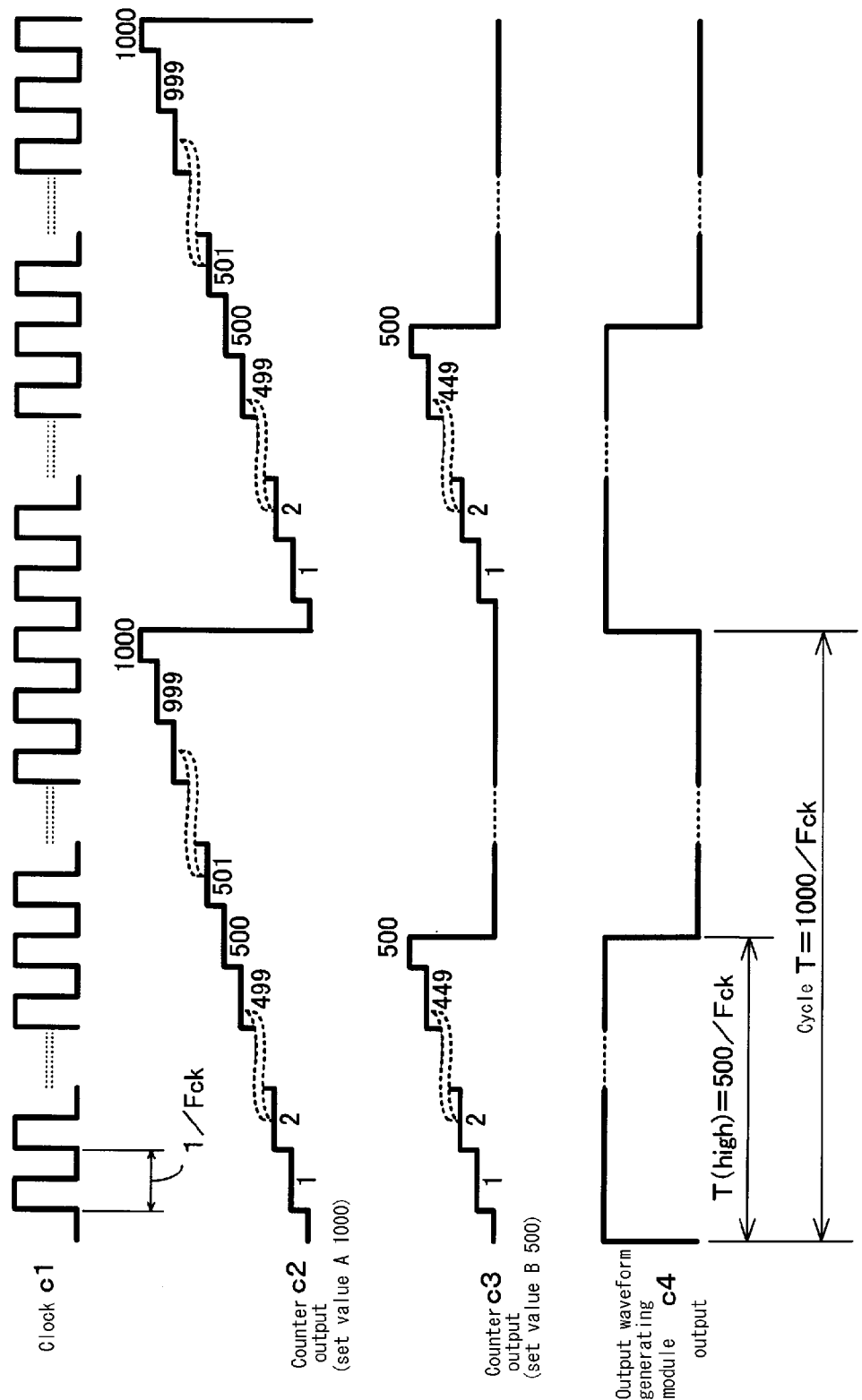
[FIG. 4] A time chart showing an operation of the pulse generating module included in the first embodiment of the switching power source device of the invention.

The pulse generating module 32c, as shown in FIG. 3, is configured of a clock circuit c1, which generates a clock signal, counters c2 and c3, and an output waveform generating module c4. As shown in the time chart of FIG. 4, initial values of the counters c2 and c3 both being zero, a counting up operation is carried out in synchronization with the clock signal of the clock circuit c1. The counter c2, being given the set value A, repeats a series of operations wherein a count number is reset to zero on the count number reaching the set value A, and the counting up operation starts again from zero. The counter c3 being given the set value B, which is smaller than the set value A, the count number is reset to zero on the count number reaching the set value B, and the counting up operation stops. Then, on the counter c2 being reset, the counter c3, in synchronization with this, starts the counting up operation again from zero, and repeats this series of operations. The output waveform generating module c4 monitors the operations of the counters c2 and c3 and, outputting a high level voltage when the counter c3 is counting up, and a low level voltage when the counting up of the counter c3 is stopped, outputs a waveform with a modulated pulse width. For example, taking a clock frequency of the clock circuit c1 to be Fck, the set value A to be 1000, and the set value B to be 500, the output waveform generating module outputs a rectangular wave with a cycle T of 1000/Fck and a high level time ratio of 0.5, the pulse width is digitally set by the set value A and set value B, and a pulse width modification is carried out by controlling this.

In the switching power source device 10, taking a switching frequency to be 500 kHz, the current control pulse generating means 32, with a view to preventing a frequency interference with the switching frequency, or the like, is set in such a way as to modulate the pulse width at a constant frequency of, for example, 10 kHz. Consequently, the constant set value A equivalent to approximately 10 kHz is set from the computing module 32b. Furthermore, the computing module 32b determines the set value B based on the target value C, which changes in accordance with information from the temperature detection means 24, input voltage detection means 26, output voltage detection means 28, and the like, outputs it to the pulse generating module 32c, and the pulse generating module 32c, based on the set value B, changes the count number at which the resetting of the counter c3 is carried out. In this way, the current control pulse generating means 32 generates the predetermined current control pulse voltage Vc, of which the pulse width has been modulated, and outputs it toward the pulse smoothing circuit 34 of a subsequent stage.

The pulse smoothing circuit 34, as shown in FIG. 1, charges the capacitor C1 with a charge, via the resistor R1, when the current control pulse voltage Vc is at a high level, and discharges the charge of the capacitor C1, via the resistor R1, when the current control pulse voltage Vc is at a low level. Because of this, the smoothing voltage Vb generated at either end of the capacitor C1 becomes approximately a direct current voltage, rises when the high level time ratio (on-duty) of the current control pulse voltage Vc increases, and drops when the high level time ratio decreases.

The current detecting circuit 38, as shown in FIG. 1, is the current detecting resistor R0 inserted in the path along which the switching current Isw flows. In the switching power source device 10, the switching current Isw being a pulse current which duplicates an approximately trapezoidal shape, a relationship between its peak value Iswp and the output current Iout, when expressed using a primary side coil number N1 and secondary side coil number N2 of the transformer T1, is Iswp $\approx$(N2/N1)×Iout. That is, a peak value of the current detecting voltage V(R0) generated in the current detecting resistor R0 is a value approximately proportional to the output current Iout. In this way, with the switching power source device 10, by monitoring the switching current Isw via the current detecting circuit 38, the output current Iout is detected. When the output current Iout flows, the current detecting voltage V(R0) is generated in a direction such that the side connected to the source terminal of the switching element TR1 has a high potential. The output of the current detecting circuit 38 is such that the terminal with the high potential is connected to a ground of the pulse smoothing circuit 34.

The current limit signal generating circuit 36, as shown in FIG. 1, compares the reference voltage Vr, which changes in accordance with the smoothing voltage Vb, and current detecting voltage V(R0) with the comparator CP1, and outputs a high level when the current detecting voltage V(R0) is lower than the reference voltage Vr, that is, when the switching current Isw is smaller than the predetermined value. Conversely, when the current detecting voltage V(R0) is higher than the reference voltage Vr, that is, when the switching current Isw is larger than the predetermined value, the current limit signal generating circuit 36 outputs a low level. Also, a relationship between the smoothing voltage Vb and reference voltage Vr is configured in such a way that when the smoothing voltage Vb rises, the reference voltage Vr also rises, and conversely, when the smoothing voltage Vb drops, the reference voltage Vr also drops.

Figure 5:
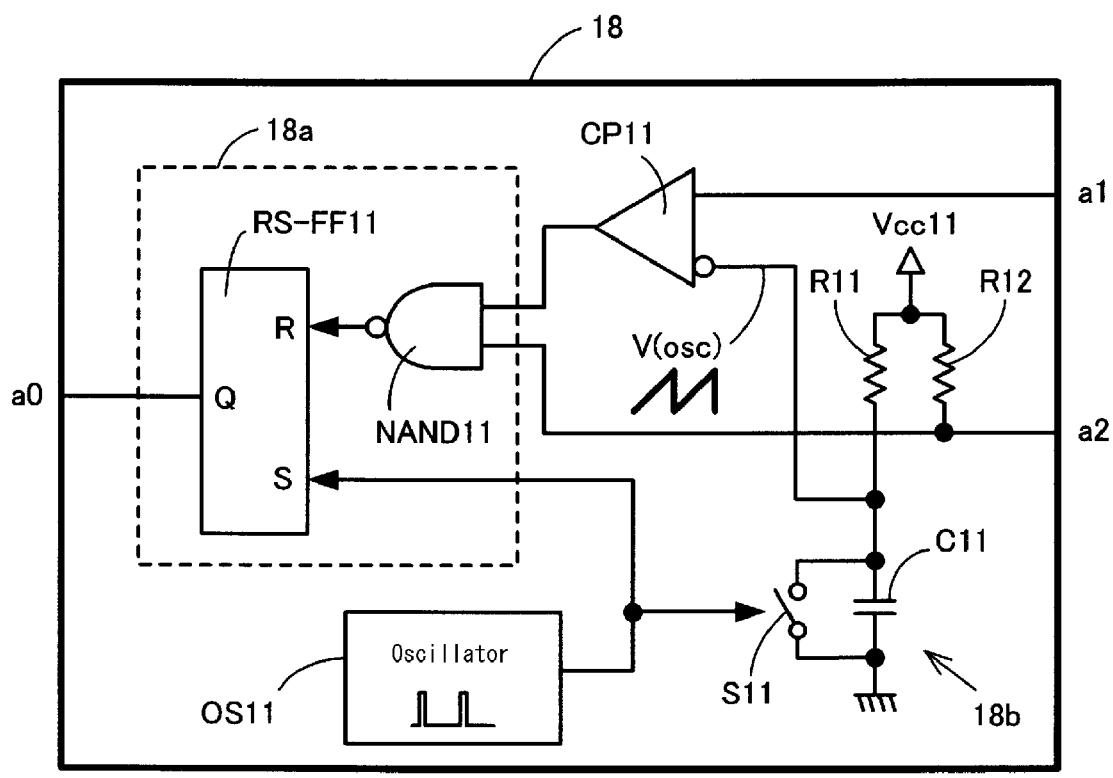
[FIG. 5] A functional block diagram showing a drive pulse generating circuit included in the first embodiment of the switching power source device of the invention.

The drive pulse generating circuit 18, as shown in FIG. 5, includes a sawtooth wave generating circuit 18b, which generates a sawtooth wave voltage V(osc), and a comparator CP11 into whose inverting terminal the sawtooth wave voltage V(osc) is input, and into whose non-inverting terminal the output voltage control signal V(vol) input from a terminal a1, which is the output of the error amplification circuit 16, is input. Furthermore, the drive pulse generating circuit 18 includes a signal selection circuit 18a configured of a NAND circuit NAND11, into which an output signal of the comparator CP11 and the current limit signal V(cur) input from a terminal a2 are input, and a heretofore known set/reset flip-flop FF11 (hereafter called the RS-FF11), into whose reset terminal R an output signal of the NAND circuit NAND 11 is input, into whose set terminal S a trigger signal generated by an oscillator 0S11 is input, and whose output terminal Q is connected to a terminal a0 of the drive pulse generating circuit 18. Then, a signal output by the output terminal Q of the RS-FF11 becomes the drive pulse Vg which drives the switching element TR1, and is input into a gate which is the drive terminal of the switching element TR1, via the terminal a0.

The sawtooth wave generating circuit 18b including a constant voltage direct current power source Vcc11, a charging resistor R11 of which one end is connected to the direct current power source Vcc11, a timer capacitor C11 connected between the other end of the charging resistor R11 and a ground, a reset element S11 connected to both ends of the timer capacitor C11, and the oscillator OS11 which controls the reset element S11, the voltage V(osc) generated at either end of the timer capacitor C11 is output.

The oscillator OS11 generates an impulse form trigger pulse. The trigger pulse, being a repetitive pulse of a constant cycle, determines the switching frequency of the switching element TR1, and a timing at which the switching element TR1 is turned on. Also, the reset element S11 performs a role of short circuiting the two ends of the timer capacitor C11 on the trigger pulse being input, instantaneously taking on a released condition, and maintaining the released condition until the next trigger pulse is input.

The drive pulse generating circuit 18 configured in this way operates as follows. Firstly, in the sawtooth wave generating circuit 18b, the trigger pulse is input from the oscillator OS11, the reset element S11 short circuits the two ends of the timer capacitor C11, and a charge is discharged, becoming the V(osc)≈0. Furthermore, the reset element S11 instantaneously takes on a released condition, the timer capacitor C11 is charged by a charging current supplied via the charging resistor R11, and the V(osc) rises. At this time, as a time constant of the series circuit of the charging resistor R11 and timer capacitor C11 is set at a sufficiently large value in comparison with the cycle of the trigger pulse, the V(osc) rises linearly at an approximately constant gradient. Subsequently, the reset element S11 short circuits on the next trigger pulse being input, and the heretofore described operation is repeated. By means of this kind of operation, the sawtooth wave voltage V(osc) is generated at either end of the timer capacitor C11.

The comparator CP11 outputs a high level in the event that the output voltage control signal V(vol) is higher than the sawtooth wave voltage V(osc), and a low level in the opposite case. The current limit signal V(cur) input from the terminal a2 is input into one input terminal of the NAND circuit NAND11, and the output signal of the comparator CP11 is input into the other input terminal. Because of this, when either the signal from the comparator CP11 or the current limit signal V(cur) is of the low level, the output of the NAND circuit NAND11 is of the high level. The RS-FF11 is such that the output of the output terminal Q is the high level due to the impulse form trigger pulse of the oscillator OS11 input into the set terminal S, and the output of the output terminal Q inverts to the low level by the high level signal from the NAND circuit NAND11 being input into the reset terminal R. The signal output from the output terminal Q of the RS-FF11 is the drive pulse Vg input into the drive terminal of the switching element TR1. That is, the RS-FF11 carries out an operation turning on the switching element TR1 while the output terminal Q outputs the high level, and turning off the switching element TR1 while the output terminal Q outputs the low level.

Next, a description will be given, based on the time chart of FIG. 6, of a series of operations of the switching power source device 10 configured as heretofore described. Firstly, a period 1 is a period during which the overcurrent protection circuit is not operating. An overcurrent setting value is controlled by the target value determined by the target value setting module 32a of the current control pulse generating means 32. A computing equation which has as parameters the temperature signal output by the temperature detection means 24, the input voltage signal output by the input voltage detection means 26, and the output voltage signal output by the output voltage detection means 28 being set in the target value setting module 32a, the target value is determined based on the computing equation. For example, in the event that a temperature dependency of a voltage VBE generated between a base and emitter of a bipolar transistor, which is one part of a circuit, has an effect on the overcurrent setting value, a temperature coefficient thereof (approximately −2 mV/° C.) is incorporated in the computing equation. Also, in the event that a fluctuation of the input voltage Vin has an effect which cannot be ignored on the approximately proportional relationship between the peak value Iswp of the switching current and the output current Iout, a coefficient relating to the input voltage Vin is incorporated in the computing equation. Also, when the overcurrent protection circuit operates, the output voltage drops, as will be described hereafter. In the event that this kind of fluctuation of the output voltage has an effect which cannot be ignored on the approximately proportional relationship between the peak value Iswp of the switching current and the output current Iout, a coefficient relating to the output voltage Vout is incorporated in the computing equation. In this way, the target value is appropriately changed based on the usage condition and operational condition of the switching power source device 10, based on which the current control pulse voltage Vc, smoothing voltage Vb, and reference voltage Vr change. As a result, the overcurrent setting value is automatically adjusted.

As the output current Iout is of a small value equal to or lower than the overcurrent setting value in the period 1, the current limit signal V(cur) output by the current limit signal generating circuit 36 maintains the high level, and the high level signal is continuously input into one input terminal of the NAND circuit NAND11 of the drive pulse generating circuit 18. Consequently, the drive pulse Vg generated at the output terminal Q of the RS-FF11 has the same logic as the output signal of the comparator CP11 and, as shown in the time chart of FIG. 6, the pulse width of the drive pulse Vg is controlled based solely on the output voltage control signal V(vol) output by the error amplification circuit 16.

In this way, in the switching power source device 10, the on-duty of the switching element TR1 drive pulse Vg is controlled in such a way that the output voltage Vout is equivalent to the reference voltage Vref in the error amplification circuit 16, and the output voltage Vout is maintained constant. At this time, the output voltage Vout is determined as in an equation (1).

[Expression 1]

$$Vout = \frac{N2}{N1} Vin \cdot duty \quad (1)$$

Herein, "N1" is the primary side coil of the transformer T1, "N2" the secondary side coil of the transformer T1, "T" the switching cycle, and "duty" the on-duty of the switching element TR1.

The next period 2 is a condition wherein, for example, a loaded electronic instrument breaks down due to low impedance, the output current Iout increases, the overcurrent protection circuit operates, and the output current Iout is limited, based on the switching current Isw, so as not to exceed the overcurrent setting value.

In this condition, the output voltage Vout drops, and the output voltage control signal V(vol) rises. Because of this, a period for which the output voltage control signal V(vol) is higher than the sawtooth wave voltage V(osc) becomes longer, and the output voltage control signal V(vol) becomes constantly higher than the sawtooth wave voltage V(osc). Accordingly, it is possible that the output of the comparator CP11 is constantly the low level, the switching element TR1 is constantly turned on, and the switching current Isw constantly flows.

Meanwhile, the current detecting voltage V(R0) generated in the current detecting resistor R0 of the current detecting circuit 38 increases due to the increase of the switching current Isw, and the current limit signal V(cur), which is the output of the comparator CP1 of the current limit signal generating circuit 36, is of the low level. Accordingly, the input of the NAND circuit NAND11 is the low level, and the output of the NAND circuit NAND11 changes from the low level to the high level. Because of this, a reset signal is output from the NAND circuit NAND11 to the reset terminal R at a timing at which the current limit signal V(cur) inverts from the high level to the low level. Then, the drive pulse Vg generated by the output terminal Q of the RS-FF11 inverts from the high level to the low level at a timing at which the reset signal is input, turning off the switching element TR1. Because of this, as the output current Iout is limited so as not to exceed the overcurrent setting value, and also, the on-duty of the switching element TR1 becomes smaller, the output voltage Vout, on the basis of the equation (1), also drops.

In this condition, the RS-FF11 has a property of maintaining the condition of the output terminal Q until the next set signal is input into the set terminal S. Consequently, on the output terminal Q becoming the low level and turning off the switching element TR1, the switching current Isw stops flowing, and the current limit signal V(cur) inverts to the high level but, the condition (the low level) of the output terminal Q being maintained until shifting to the next cycle, the switching element TR1 maintains the turned off condition. Meanwhile, on the output voltage Vout dropping as heretofore described, the error amplification circuit 16, which is an inverting amplifier, is saturated at the high level, and the output voltage control signal V(vol) maintains a saturation voltage value of the high level.

Figure 6:
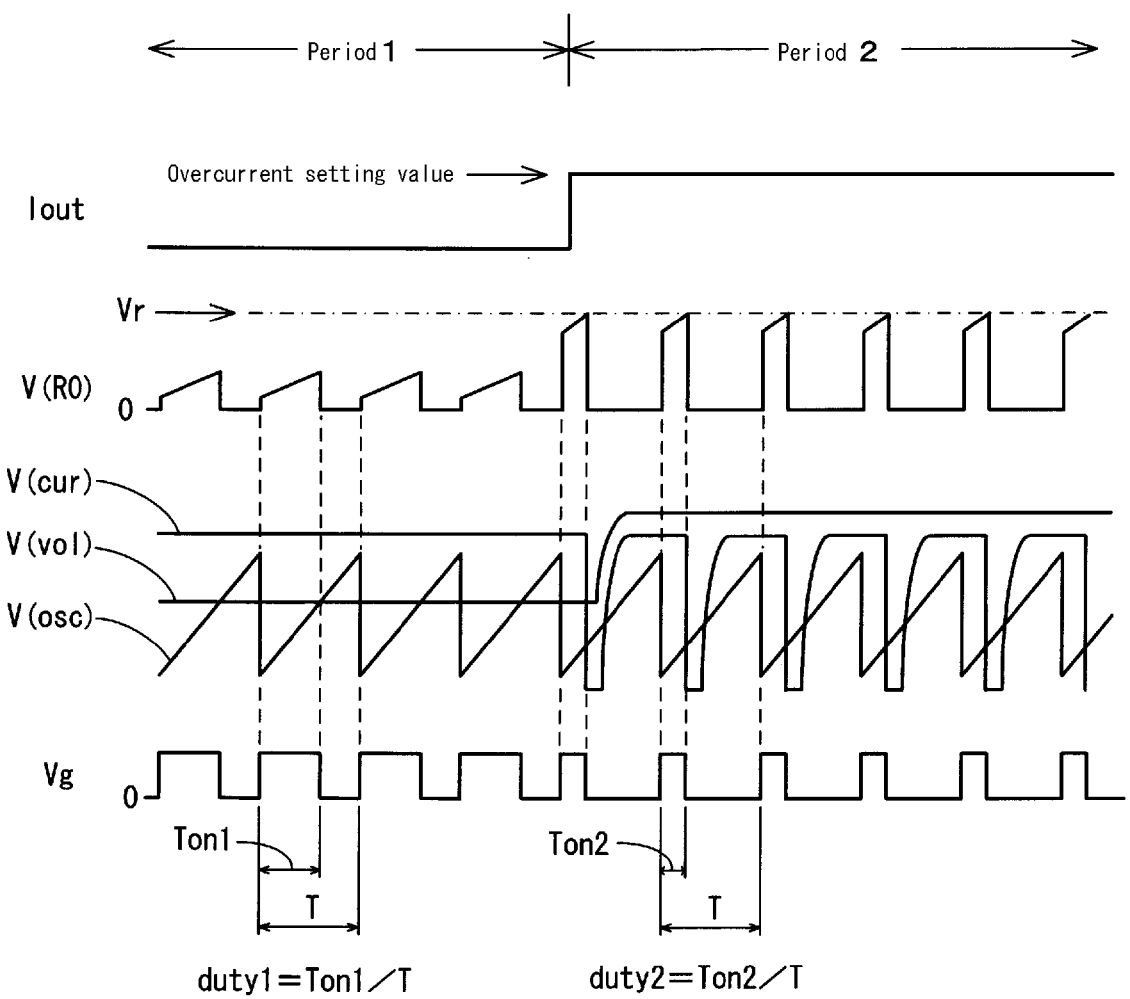
[FIG. 6] A time chart showing an operation of the drive pulse generating circuit included in the first embodiment of the switching power source device of the invention.

Consequently, the drive pulse Vg generated at the output terminal Q of the RS-FF11 inverts to the low level in synchronization with a timing at which the current limit signal V(cur) inverts to the low level and, as shown in the time chart of FIG. 6, the pulse width of the drive pulse Vg is controlled based solely on the current limit signal V(cur) output by the current limit signal generating circuit 36.

In this way, it being sufficient, in the switching power source device 10, that the digital processor configuring the current control pulse generating means 32 is one which operates at a low frequency of around 10 kHz, it is possible to realize a switching power source device with excellent intelligence, using a general-purpose digital processor with a low speed clock and a low cost.

Also, by monitoring in real time the usage condition and operational condition (the conditions of the ambient temperature, input voltage, and output voltage) under which the switching power source device 10 operates, and constantly automatically adjusting the overcurrent setting value to the predetermined value based thereon, even in the event that a loaded electronic instrument falls into an abnormal condition, it is possible to prevent a burnout accident, or the like, and to provide a high degree of safety. Furthermore, as it is possible to ensure the safety of the switching power source device itself, even without selecting large parts with excessive leeway with respect to a rated current and rated temperature as power parts configuring a power circuit, it is possible to contribute to the miniaturization and reduction in cost of the switching power source device.

Figure 8:
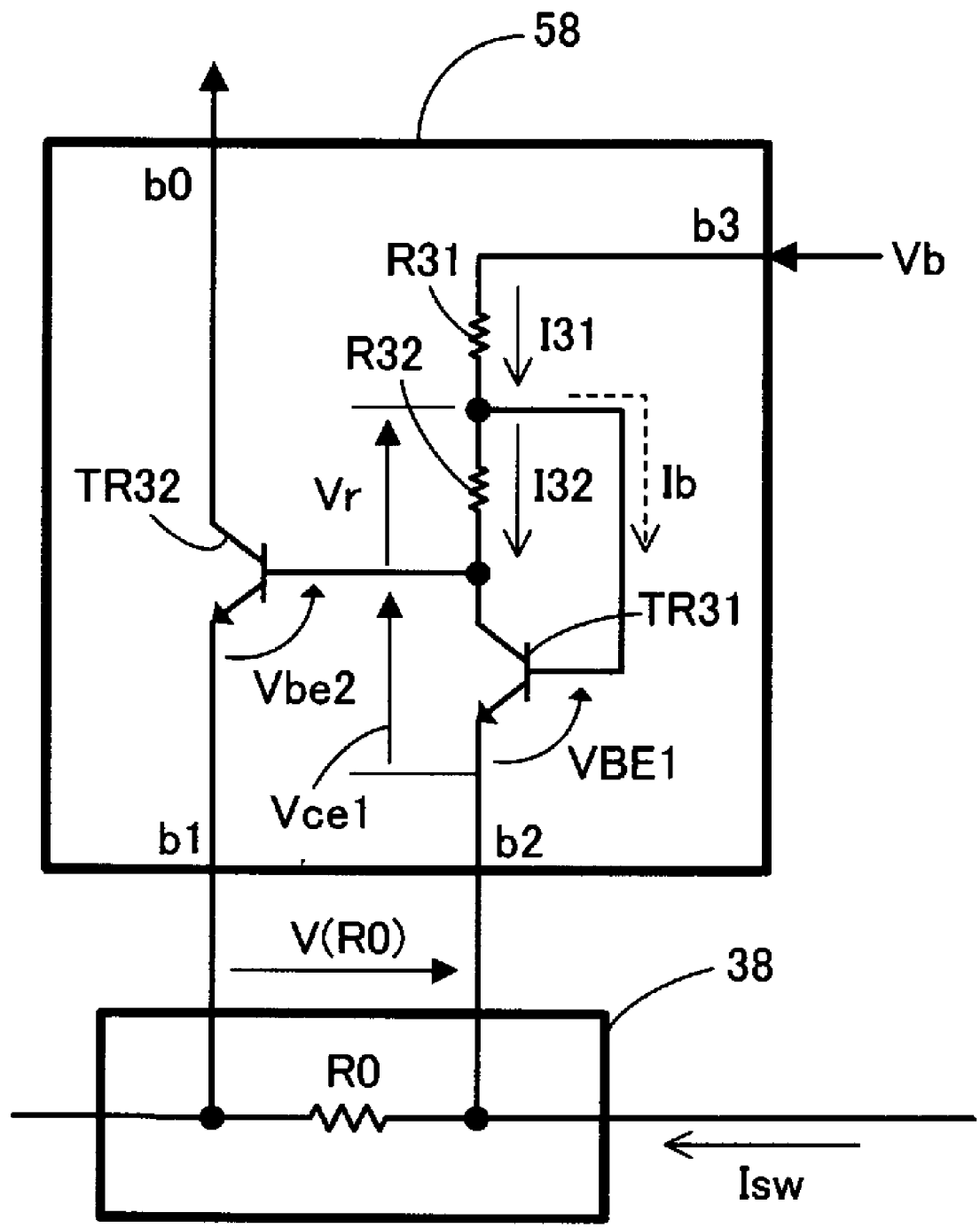
[FIG. 8] A circuit diagram showing a current limit signal generating circuit included in the second embodiment of the switching power source device of the invention.
Figure 9:
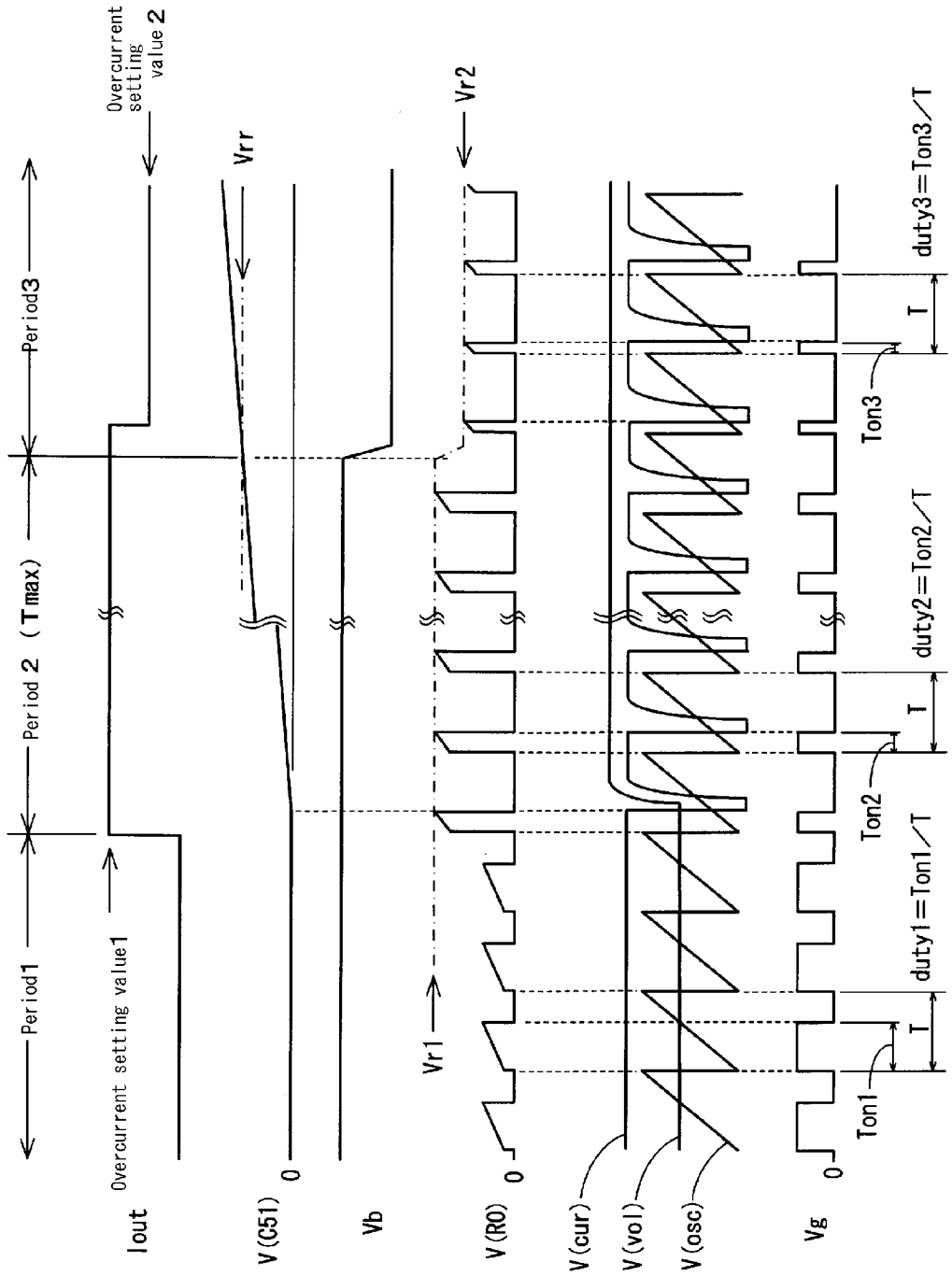
[FIG. 9] A time chart showing an operation of the current limit signal generating circuit included in the second embodiment of the switching power source device of the invention.

Next, a description will be given, based on FIGS. 7 to 9, of a second embodiment of the switching power source device of the invention. Configurations identical to those of the heretofore described switching power source device 10 will be given identical reference numerals and characters, and a description will be omitted. Firstly, a description will be given of an outline, based on the overall circuit diagram of FIG. 7. A switching power source device 50 includes an inverter circuit 12 to which a direct current input power source Ein is connected, and which generates an alternating current voltage V2 in accordance with an on-off operation of a switching element TR1, and a rectification and smoothing circuit 14 which rectifies and smoothes the alternating current voltage V2, obtaining an output voltage Vout, and an output voltage Vout terminal is connected to a load 22. The output voltage Vout is connected to an error amplification circuit 16 configured of an inverting amplifier which outputs an output voltage control signal V(vol), wherein a difference between the output voltage Vout and a predetermined reference voltage Vref is amplified. Furthermore, the switching power source device 50 is equipped with a drive pulse generating circuit 18 which carries out a pulse width modulation in accordance with the output voltage control signal V(vol) output from the error amplification circuit 16, and outputs a drive pulse Vg toward a drive terminal of the switching element TR1.

Also, there is provided current control pulse generating means 54 including a target value setting module 32a, which determines a target value based on an operating time expiration signal output from current limit operating time monitoring means 52, to be described hereafter, a computing module 32b, which carries out a computing process based on the target value, and a pulse generating module 54c which, based on a result of the computation, generates a current control pulse voltage Vc for controlling an output current. Then, the output of the current control pulse generating means 54 is connected to an input of a pulse smoothing circuit 56. In the pulse generating module 54c, a switch element S41 and switch element 542 are connected in series between a power source voltage Vcc41 and a ground, and a midpoint of the two switch elements is connected to the pulse smoothing circuit 56. Then, the two switch elements are each controlled by a signal output by the computing module 32b. The pulse generating module 54c carries out an operation different from that of the heretofore described pulse generating module 32c in the switching power source device 10. Details will be described hereafter.

The pulse smoothing circuit 56 configures an integrated circuit with a first resistor R21 and capacitor C21, and furthermore, a series circuit of a diode D21 and second resistor R22 is connected parallel to the first resistor R21. In this case, a cathode of the diode D21 is connected to an output terminal e0 of the current control pulse generating means 54. Outputs of the pulse smoothing circuit 56, being both ends of the capacitor C21 at which a smoothing voltage Vb is generated, are connected to a current limit signal generating circuit 58, to be described hereafter.

Also, a current detecting circuit 38, which is a current detecting resistor R0, being inserted between a source terminal of the switching element TR1 and a minus terminal of the input power source Ein, a voltage according to a switching current Isw flowing in the current detecting resistor R0 is generated at either end thereof. Both ends of the current detecting resistor R0 are connected to the current limit signal generating circuit 58 as outputs of the current detecting circuit 38.

The current limit signal generating circuit 58 including a resistor R31, of which one end is connected to the output of the pulse smoothing circuit 56, a resistor R32, of which one end is connected to the other end of the resistor R31, and a transistor TR31, whose collector terminal is connected to the other end of the resistor R32, and whose emitter terminal is connected to a ground of the pulse smoothing circuit 56, a base terminal of the transistor TR31 is connected to a midpoint of the resistor R31 and resistor R32. Furthermore, there being provided a transistor TR32 whose base terminal is connected to the collector terminal of the transistor TR31, and whose emitter terminal is connected to an input power source Ein minus terminal side of the current detecting resistor R0, a collector terminal forms an output of the current limit signal generating circuit 58 as an open collector. The transistors TR31 and TR32 are NPN transistors.

The drive pulse generating circuit 18 being a circuit which carries out a pulse width modulation in response to the input current limit signal V(cur), and outputs the drive pulse Vg of the switching element TR1, its output is connected to the drive terminal of the switching element TR1.

The current limit operating time monitoring means 52 includes first comparing means 52a configured of a comparator into which are input the output of the error amplification circuit 16 and the output of the current limit signal generating circuit 58. Furthermore, the current limit operating time monitoring means 52 includes a timer circuit 52b, whose operation is controlled by an output signal of the comparing means 52a, and second comparing means 52c configured of a comparator. The comparing means 52c is configured so as to, in the event that the output of the comparing means 52a continues at a low level for a predetermined time, generate the operating time expiration signal in place of the signal being output until that time, and output it toward the target value setting module 32a of the current control pulse generating means 54.

Next, based on FIGS. 7 to 9, a detailed individual description will be given of a configuration and operation of each circuit block of the switching power source device 50. The inverter circuit 12 being such that the rectification and smoothing circuit 14, error amplification circuit 16, drive pulse generating circuit 18, and current detecting circuit 38 are the same as in the heretofore described switching power source device 10, a description will be omitted.

Figure 7:
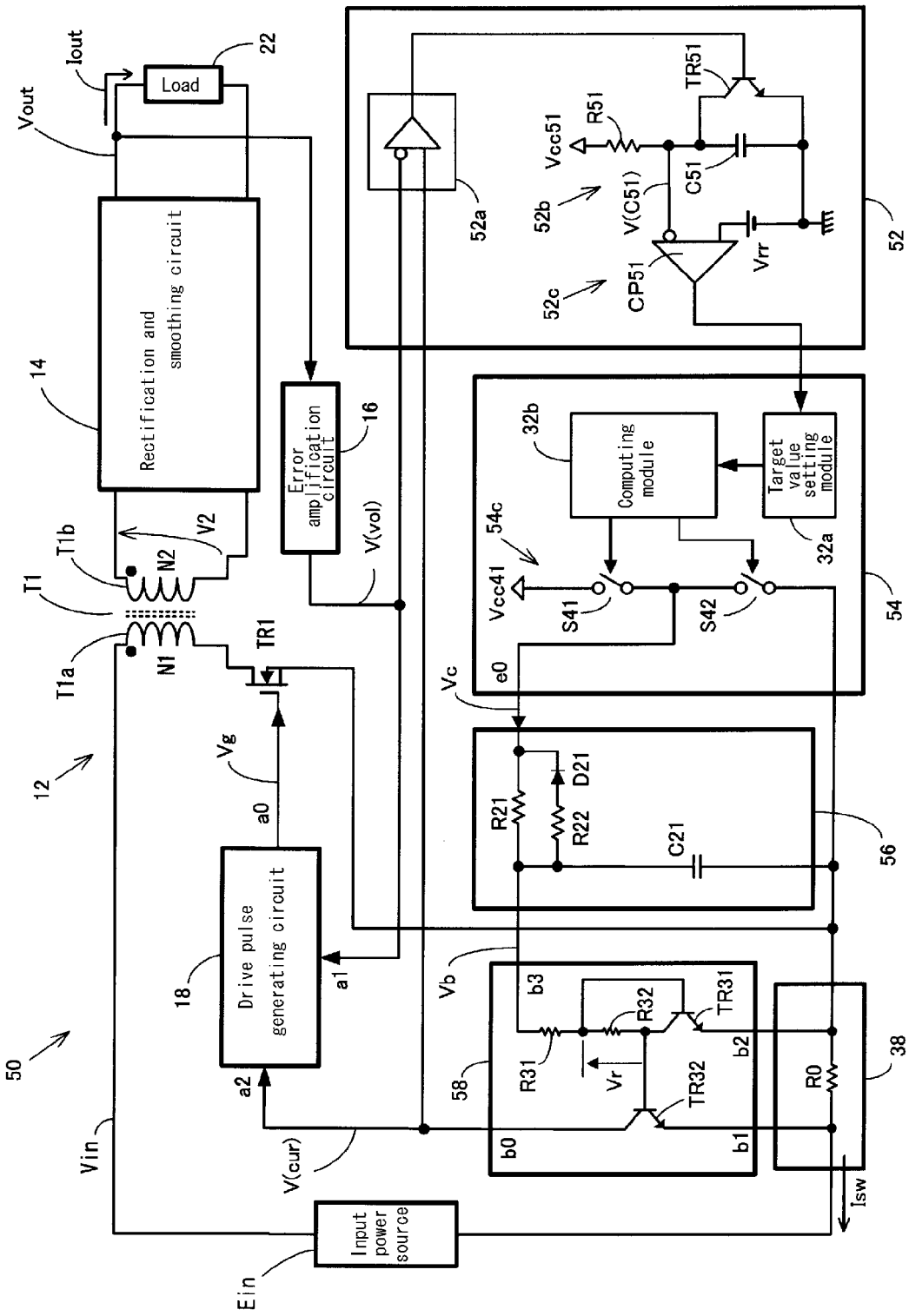
[FIG. 7] A block diagram showing a second embodiment of the switching power source device of the invention.

The current control pulse generating means 54, being configured using, for example, a general-purpose digital processor (a microcomputer), includes the target value setting module 32a, computing module 32b, and pulse generating module 54c, as shown in FIG. 7. The target value setting module 32a, on the operating time expiration signal being input from the current limit operating time monitoring means 52, carries out a computing process based on the operating time expiration signal, determines the target value in such a way as to reduce an overcurrent setting value to a predetermined low value, and outputs it to the computing module 32b. When the operating time expiration signal is not input from the exterior, the target value setting module 32a determines the target value based on a predetermined default value fixedly stored in advance.

The computing module 32b carries out a computing process based on the target value input from the target value setting module 32a, and outputs a control signal to each of the switch elements S41 and S42 of the pulse generating module 54c. The switch element S42 on the ground side of the pulse generating module 54c is turned on for a predetermined period from when the operating time expiration signal is output from the current limit operating time monitoring means 52, and constantly indicates a turned off condition in periods other than this. When the switch element S42 is turned on, the switch element S41 is turned off. Conversely, when the switch element S42 is turned off, the switch element S41 performs an operation alternating between being turned on and turned off.

Consequently, in a period during which the switch element S42 is turned off, a high level voltage (Vcc41) is generated at the output terminal e0 when the switch element S41 is turned on, while when the switch element S41 is turned off, the output terminal e0 takes on a floating condition, and is electrically cut off from the pulse generating module 54c. Also, in a period during which the switch element S42 is turned on, the switch element S41 being in a turned off condition, the output terminal e0 has a ground potential (low level).

In the pulse smoothing circuit 56, when the output terminal e0 of the pulse generating module 54c is at the high level, the capacitor C21 is gradually charged with a charge via the resistor R21, and the smoothing voltage Vb gradually rises. When the output terminal e0 is floating, the charge of the capacitor C21 is gradually discharged via a discharge path of a circuit portion connected parallel to the capacitor C21, and the smoothing voltage Vb gradually drops. Consequently, in the event that a high level time ratio of the output terminal e0 of the current control pulse generating means 54 increases, the smoothing voltage Vb rises, and conversely, in the event that the high level time ratio of the output terminal e0 decreases, the smoothing voltage Vb drops. In the switching power source device 50 of the embodiment, an input side impedance of the current limit signal generating circuit 58 also performs the role of the heretofore mentioned discharge path, no designated resistor, or the like, specifically forming the discharge path is connected.

Meanwhile, when the output terminal e0 is of the ground potential, the charge of the capacitor C21 is precipitously discharged via the series circuit of the resistor R22 and diode D21, in addition to the resistor R21, and the smoothing voltage Vb drops precipitously. That is, on the operating time expiration signal being output from the current limit operating time monitoring means 52, it is possible to cause the smoothing voltage Vb to drop precipitously, because of which it is possible to carry out a high speed switching of the overcurrent setting value, to be described hereafter.

A description will be given, based on FIG. 8, of an operation of the current limit signal generating circuit 58. The transistor TR31 operating in an active condition, a voltage VBE1 generated by a base-emitter current is generated between the base and emitter. Consequently, a current I31 flowing in the resistor R31 is expressed as in an equation (2).

[Expression 2]

$$I31 = \frac{1}{R31}(Vb - VBE1) \qquad (2)$$

Herein, assuming that a current amplification factor hFE of the transistor TR31 is sufficiently high, a current I32 flowing in the resistor R32 is equivalent to the current I31, and a voltage Vr generated in the resistor R32 is expressed as in an equation (3).

[Expression 3]
$$Vr = \frac{R32}{R31}(Vb - VBE1) \quad (3)$$

As is understood from the equation (3), it being possible to control the voltage Vr generated in the resistor R32 with the smoothing voltage Vb in the current limit signal generating circuit 58, it performs the role of the reference voltage Vr in the heretofore described current limit signal generating circuit 36.

Also, a voltage Vce1 generated between the collector and emitter of the transistor TR31 is expressed as in an equation (4).
[Expression 4]
$$Vce1 = VBE1 - Vr \quad (4)$$

Also, assuming that a voltage applied between the base and emitter of the transistor TR32 is Vbe2, the switching current Isw flows in the current detecting resistor R0, and a voltage V(R0) is generated, the voltage applied as the Vbe2 is as expressed in equation (5).
[Expression 5]
$$Vbe2 = Vce1 + V(R0) = Vce1 + Isw \cdot R0 \quad (5)$$

Herein, in the event that voltages VBE1 and VBE2 generated by base-emitter currents of the transistors TR31 and TR32 indicate the same characteristics, and that a voltage at which the transistor TR31 and transistor TR32 can be turned on is VBE in each case, when the current detecting voltage V(R0) is of a value equal to that of the reference voltage Vr, Vbe2 becomes equal to VBE, and the transistor TR32 can be turned on. For example, when the switching current Isw is zero, the voltage Vbe2 applied between the base and emitter of the transistor TR32 is lower than the voltage VBE between the base and emitter, as in the equation (5), so the transistor TR32 cannot be turned on. However, on the switching current Isw increasing, and the current detecting voltage V(R0) reaching the reference voltage Vr, the voltage Vbe2 applied between the base and emitter of the transistor TR32 reaches the voltage VBE between the base and emitter at which the TR32 can be turned on, and the transistor TR32 can be turned on.

In this way, the current limit signal generating circuit includes the reference voltage Vr, which changes in accordance with the smoothing voltage Vb. Furthermore, the current detecting voltage V(R0) and reference voltage Vr are compared by means of the base-emitter voltage when the transistors TR31 and TR32 are turned on and, when the current detecting voltage V(R0) is lower than the reference voltage Vr, that is, when an output current Iout is small, the collector terminal of the transistor TR32 outputs the high level. Conversely, when the current detecting voltage V(R0) reaches the reference voltage Vr, that is, when the output current Iout reaches a predetermined value, the collector terminal of the transistor TR32 outputs the low level.

Also, a relationship between the smoothing voltage Vb and reference voltage Vr is configured in such a way that when the smoothing voltage Vb rises, the reference voltage Vr also rises, and conversely, when the smoothing voltage Vb drops, the reference voltage Vr also drops. The drive pulse generating circuit 18, a pull-up resistor R12 being connected between a terminal a2, to which the output of the current limit signal generating circuit 58 is connected, and a power source voltage Vcc11, as shown in FIG. 5, has a configuration which accommodates the open collector type of output formed by the transistor TR32.

The comparing means 52a provided in the current limit operating time monitoring means 52, the output voltage control signal V(vol) output by the error amplification circuit 16 and the current limit signal V(cur) output by the current limit signal generating circuit 58 being input, outputs the high level during normal operation, the current limit signal V(cur) being higher, and outputs the low level in the event that the current limit signal V(cur) becomes lower.

In the timer circuit 52b, a reset element TR51 is turned off when the comparing means 52a outputs the low level, and a charging of a timer capacitor C51 is started. Then, in the event that a voltage at either end of the timer capacitor C51 becomes higher than a predetermined reference voltage Vrr, the comparing means 52c outputs the low level in place of the high level signal being output until that time, and outputs it toward the target value setting module 32a of the current control pulse generating means 54 as the operating time expiration signal.

Also, as the reset element TR51 is turned on when the comparing means 52a outputs the high level, the charging of the timer capacitor C51 is not carried out, and the timer circuit 52b does not operate.

Next, a description will be given, based on the time chart of FIG. 9, of a series of operations of the switching power source device 50 configured as heretofore described. A period 1 is a period during which an overcurrent protection circuit is not operating. Also, a period 2 is a period during which the overcurrent protection circuit operates in accordance with a first overcurrent setting value. A period 3 is a period during which the overcurrent protection circuit operates in accordance with a second overcurrent protection setting value. Herein, as the operations of the period 1 and period 2 are the same as the operations of the heretofore described switching power source device 10, a description will be omitted.

As heretofore described, on the period 2 starting, a condition continues in which the current limit signal V(cur) generated at the output of the current signal generating circuit 58 is lower than the output voltage control signal V(vol) generated at the output of the error amplification circuit 16. The two signals are input into the comparing means 52a of the current limit operating time monitoring means 52, and the comparing means 52a continues to output the low level. Accordingly, the reset element TR51 switches from a turned on to a turned off condition in accordance with the low level signal output by the comparing means 52a. Accordingly, the timer capacitor C51 is charged with a charge from a direct current power source VccS1 via a charging resistor R51, and the voltage at either end of the timer capacitor C51 rises. The voltage at either end of the timer capacitor C51 is compared with the predetermined reference voltage Vrr by the comparing means 52c and, in the event that the voltage at either end of the timer capacitor C51 is higher than the reference voltage Vrr, the operating time expiration signal is generated at the output of the comparing means 52c in place of the digital signal being output until that time. The length of the period 2, being set at an allowable upper limit value Tmax of a time for which the switching power source device 50 can supply a peak current to a load, can be appropriately set in accordance with the power source voltage Vcc5l, charging resistor R51, timer capacitor C51, and reference voltage Vrr. In this way, a signal informing of the fact that the operating time of the overcurrent protection circuit according to the first overcurrent setting value has reached the allowable upper limit value Tmax is output toward the target value setting module 32*a* of the current control pulse generating means 54 from the current limit operating time monitoring means 52.

The current control pulse generating means 54 is controlled by the target value determined by the target value setting module 32*a*. On the operating time expiration signal being input, the target value setting module 32*a*, in order to change the overcurrent setting value from the first setting value to the second setting value, computes and determines a second target value based on the operating time expiration signal. As the second overcurrent setting value is one set taking into consideration the safety of a broken down electronic instrument, and the like, the second setting value is set lower than the first setting value. Then, on the second target value being input into the computing module 32*b*, the high level time ratio of the current control pulse voltage Vc decreases based thereon, the smoothing voltage Vb drops, and the reference voltage Vr drops, as a result of which the overcurrent setting value is changed to the second setting value, which is lower than the first setting value, and the output current Iout is controlled so as not to exceed the second setting value.

Furthermore, in the case of the switching power source device 50, in order to switch the first overcurrent setting value to the second setting value swiftly, it is necessary to cause the smoothing voltage Vb to drop precipitously. Therein, the switch element S42 is used in the pulse generating module 54*c*, and the series circuit of the resistor R22 and diode D21 in the pulse smoothing circuit 56. Inc case in which the switch element S42 is not used in the pulse generating module 54*c*, the resistance value of the discharge path of the capacitor C21 is large, meaning that the smoothing voltage Vb only drops at a gentle speed. Therein, for only the extremely short time in which the first overcurrent setting value is switched to the second setting value, the switch element S42 is turned on, and a discharge path configured of the resistor R22 and diode D21, with a low resistance value, is provided. Because of this, as shown in FIG. 9, the smoothing voltage Vb can drop precipitously, and the switching of the overcurrent setting value is carried out swiftly.

As heretofore described, even in the event that the current control pulse generating means 54 of the switching power source device 50 is configured of a general-purpose digital processor with a low-speed clock, it is possible to realize a sufficient performance. Also, by using a general-purpose digital processor to configure the current limit operating time monitoring means 52 too, it is possible to improve a time monitoring accuracy. In this way, with the switching power source device 50 of the embodiment, it is possible to provide, at a low cost, a switching power source device with excellent intelligence, including a highly accurate overcurrent protection circuit, without using high-performance, high-cost digital processor.

Also, by accommodating an instrument in which a peak current flows by accurately controlling the first and second overcurrent setting values, and overcurrent protection operating time, it is possible to provide a high degree of safety which prevents a burnout accident, or the like, even when a loaded electronic instrument falls into an abnormal condition. Furthermore, as it is possible to ensure the safety of the switching power source device itself, even without selecting large parts with excessive leeway with respect to a rated current and rated temperature as power parts configuring a power circuit, it is possible to contribute to the miniaturization and reduction in cost of the switching power source device.

Figure 10:
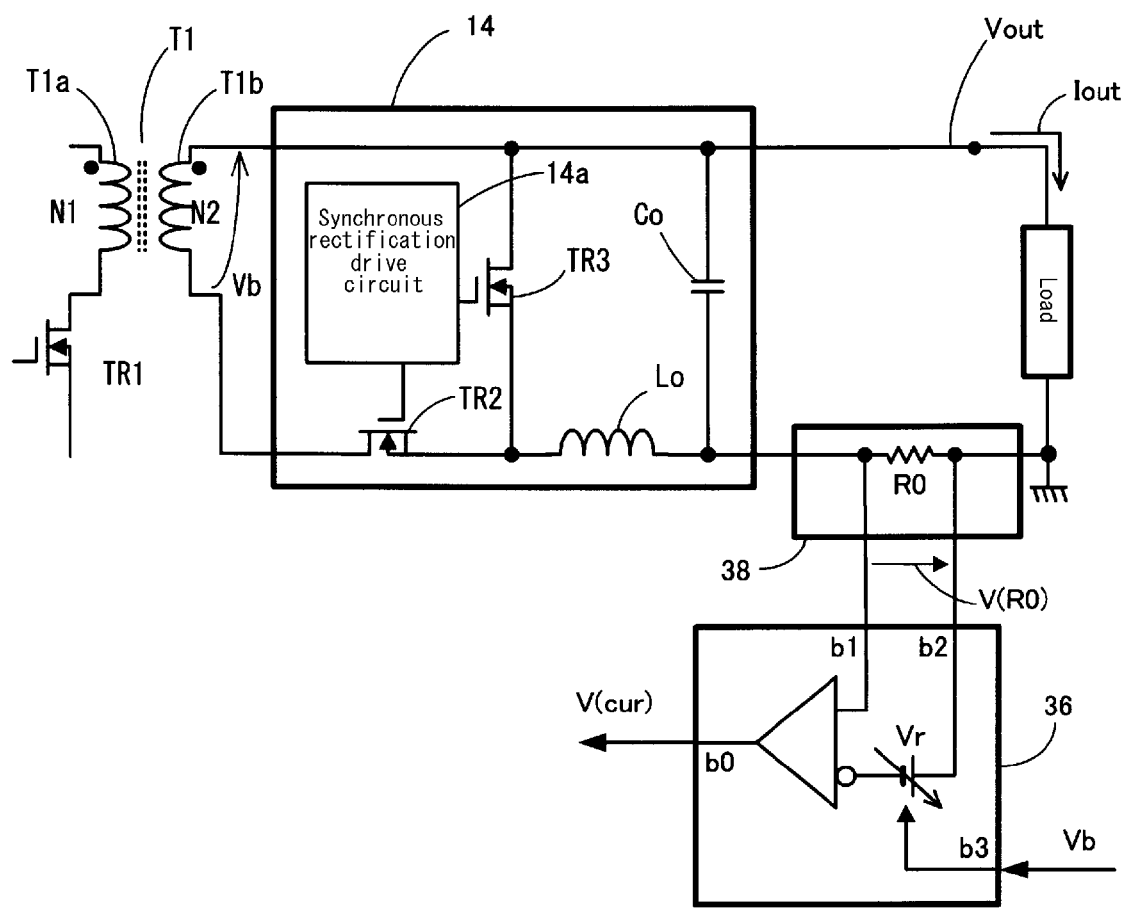
[FIG. 10] A circuit diagram showing a current detecting circuit of a third embodiment of the switching power source device of the invention.

Next, a description will be given, based on FIG. 10, of a third embodiment, which is a modification example of the switching power source device 10 of the first embodiment of the invention. Herein, the current detecting circuit 38, which is the current detecting resistor R0, is inserted between the minus side of the capacitor Co of the rectification and smoothing circuit 14, and the minus side of the load 22. In the case of the embodiment, as the output current Iout flows in the current detecting resistor R0, it is possible to detect the output current Iout more reliably than in the case of detecting the output current Iout as an alternative characteristic of the switching current Isw flowing in the switching element TR1. While the switching current Isw is a pulse current of an approximately trapezoidal shape duplicated at the switching frequency, the output current Iout is a direct current, or a current which fluctuates at a comparatively low speed, but as the operation as a whole switching power source device is the same as the switching power source device 10, a description will be omitted.

This embodiment is of an aspect appropriate to a non-insulated type of switching power source device, and the like. However, even with an insulated type of switching power source device, provided that it is possible to maintain the insulation between the primary circuit and secondary circuit of the power source device in the overcurrent protection circuit too, there is no problem in applying the modification example.

Figure 11:
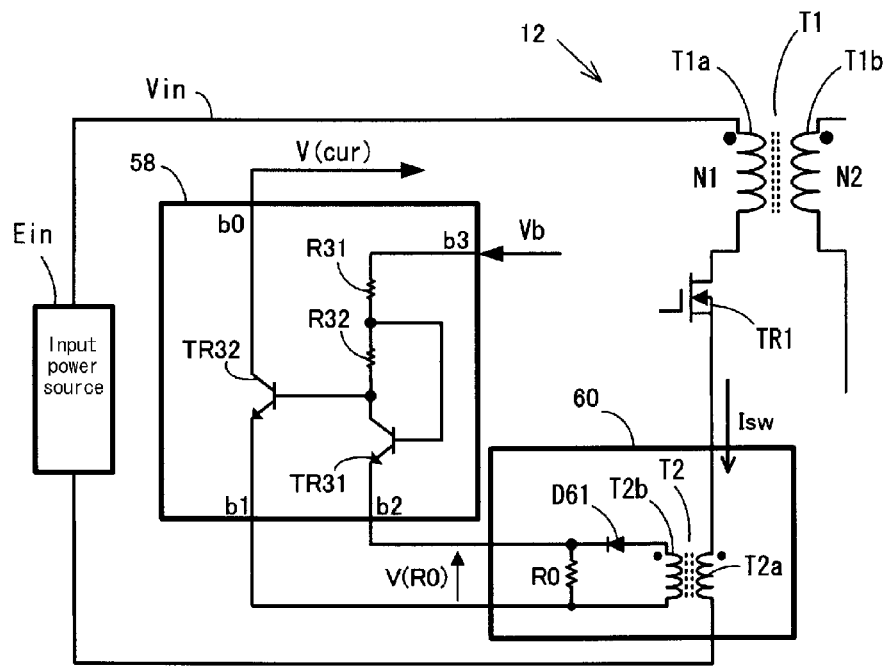
[FIG. 11] A circuit diagram showing a current detecting circuit of a fourth embodiment of the switching power source device of the invention.

Next, a description will be given, based on FIG. 11, of a fourth embodiment, which is a modification example of the switching power source device 50 of the second embodiment of the invention. Herein, the current detecting circuit 38, which is the current detecting resistor R0, is replaced with a current detecting circuit 60, which monitors the switching current Isw using a current transformer T2. The current detecting circuit 60 is such that a primary side coil T2*a* of the current transformer T2 is connected in series to the switching element TR1, a series circuit of a rectification diode D61 and the current detecting resistor R0 is connected in parallel to a secondary side coil, and both ends of the current detecting resistor R0 are connected to the current limit signal generating circuit 58 as an output of the current detecting circuit 60. In this case, a current which is the switching current Isw multiplied by a turn ratio of the current transformer T2 flows in the current detecting resistor R0, and the current detecting voltage V(R0), of a value which is the current further multiplied by R0, is output. In the modification example, it is acceptable that the ground of the pulse smoothing circuit which outputs the smoothing voltage Vb is connected to the emitter terminal side of the TR32. In this case, by setting in such a way that the current detecting voltage V(R0) is of a sufficiently low value in comparison with the smoothing voltage Vb, the switching power source device of the embodiment operates in the same way as the heretofore described switching power source device 50. Also, with a circuit using the current transformer T2 too, in the same way as in the switching power source device of the previous second embodiment, it is also possible to configure a circuit wherein the ground of the pulse smoothing circuit is connected to the emitter terminal side of the TR31.

Figure 12:
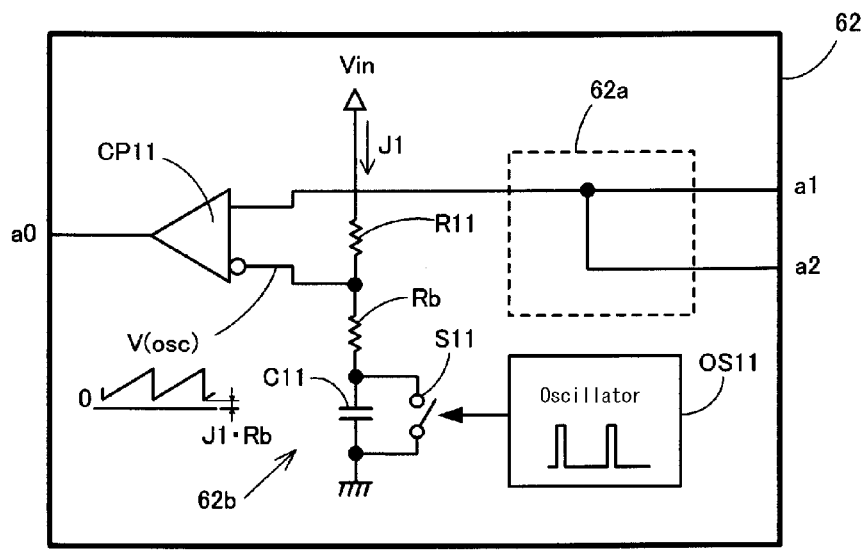
[FIG. 12] A functional block diagram showing a drive pulse generating circuit of a fifth embodiment of the switching power source device of the invention.

Next, a description will be given, based on FIG. 12, of a fifth embodiment, which is a modification example of the drive pulse generating circuit 18 of the switching power source device of the invention. In a drive pulse generating circuit 62 of the embodiment, as the charging resistor R11 of a sawtooth wave generating circuit 62*b* is connected to the input voltage Vin, the gradient at which the sawtooth wave voltage V(osc) rises changes in proportion to the input voltage. Because of this, a feed forward control according to the fluctuation of the input voltage is added to the feedback control of the output voltage, and a high-speed responsiveness of an output voltage stabilizing control increases.

Furthermore, a voltage generating element Rb, at which a voltage proportionate to the input voltage is generated, is inserted at a midpoint of the timer capacitor C11 and charging resistor, and a total value of the voltage generated at the timer capacitor C11 and voltage generated at the voltage generating element Rb is input into the comparator CP11 as the sawtooth wave voltage V(osc). Because of this, a direct current voltage according to the input voltage Vin is weighted on the sawtooth wave voltage V(osc), an amount of delay time of the comparator C11 is corrected in accordance with the input voltage Vin, the heretofore mentioned feed forward control characteristic is improved, and the high-speed responsiveness of the output voltage stabilizing control further increases.

Also, a signal selection circuit 62a directly links the terminal a1, into which the output voltage control signal V(vol) is input, and the terminal a2, into which the current limit signal V(cur) is input, simplifying the circuit configuration. It is sufficient that the signal selection circuit 62a is one which selects a signal in such a way that a pulse width modulation of the drive pulse Vg based on the movement of the current limit signal V(cur) is carried out when the overcurrent is detected. In the case of using the signal selection circuit 62a too, the same kind of operation as with the heretofore described drive pulse generating circuit 18 is carried out.

However, as the signal selection circuit 62a is one which directly links the output of the error amplification circuit 16 and the output of the current limit signal generating circuit 36 of the first embodiment or current limit signal generating circuit 58 of the second embodiment, it cannot be applied in a configuration including the current limit operating time monitoring means 52 of the switching power source device 50. This is because the comparing means 52a of the current limit operating time monitoring means 52 cannot detect the operating condition of the overcurrent protection. Consequently, in the case in which the signal selection circuit 62a is used, it is sufficient to use, for example, a method wherein the comparing means 52a of the current limit operating time monitoring means 52 is configured in such a way as to monitor the output voltage Vout, and output the low level when the output voltage Vout drops to or below a predetermined voltage. This is a method which, as the condition in which the output voltage Vout drops to or below the predetermined voltage can be seen as a condition in which the previously mentioned current limit signal V(cur) repeatedly generates the low level for each switching frequency, or a condition in which the low level continues, monitors the output voltage Vout as an alternative characteristic.

Figure 13:
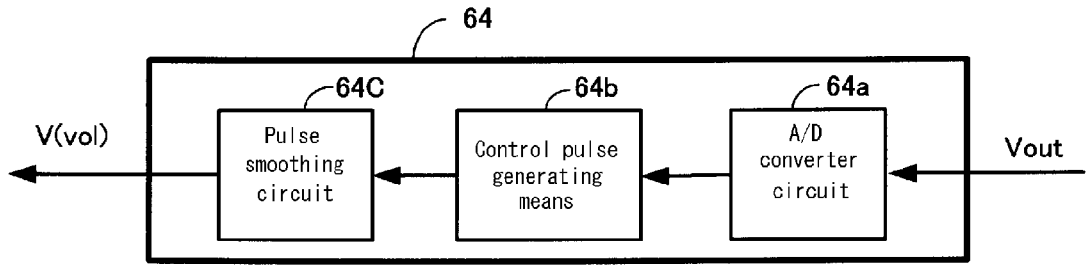
[FIG. 13] A functional block diagram showing an error amplification circuit of a sixth embodiment of the switching power source device of the invention.

Furthermore, a description will be given, based on FIG. 13, of a sixth embodiment, which is a modification example of the error amplification circuit 16 of the switching power source device of the invention. An error amplifier 64 includes an A/D converter 64a, which converts the output voltage Vout into a digital signal, control pulse generating means 64b, which generates a control pulse based on the digital signal, and a pulse smoothing circuit 64c, which smoothes the control pulse, and outputs the output voltage control signal V(vol). According to the error amplifier 64, it being possible to configure the error amplification circuit 16 using a low-cost general-purpose digital processor with a low-speed and low clock frequency, it is possible to realize a switching power source device with excellent intelligence at a low cost.

Figure 14:
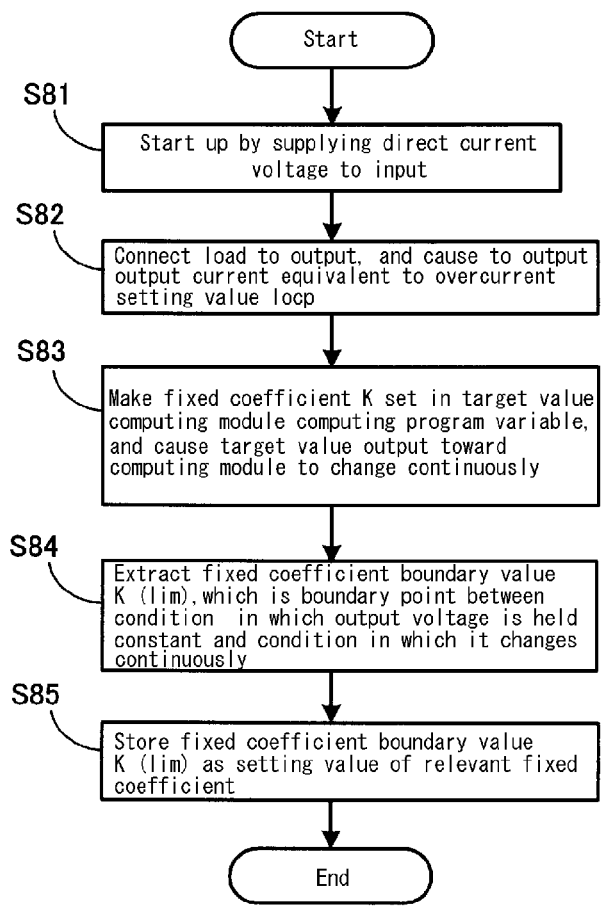
[FIG. 14] A flowchart showing an initial setting method of a seventh embodiment, which is a drive method of the switching power source device of the invention.
Figure 15:
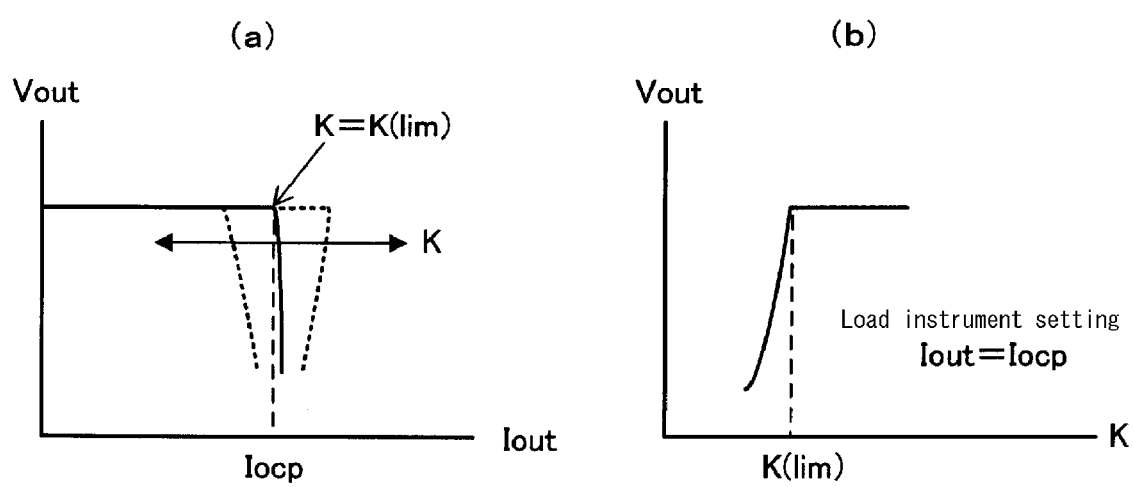
[FIG. 15] Graphs illustrating the behavior of an output voltage of the switching power source device in a target value varying process and boundary value extraction process of the initial setting method of the seventh embodiment, which is the drive method of the switching power source device of the invention.

Next, a description will be given, based on FIGS. 14 and 15, of an embodiment of an initial setting method in an initial drive stage of the switching power source device, which is a seventh embodiment of the switching power source device of the invention. Firstly, a description will be given of each step shown in the flow of FIG. 14.

Step S81 is a process of supplying an input voltage to the switching power source device 10, thus starting it up. By this means, the switching element carrying out a switching operation and outputting the predetermined output voltage Vout, the switching power source device 10 is placed into a standby condition wherein the output current Iout can be supplied.

Step S82 is a process of connecting a load device to the output of the switching power source device 10, and carrying out a setting of the load device in such a way that an output current Iout equivalent to a desired overcurrent setting value is output. It is preferable that the load device used here is, for example, a current controlling type of electronic load device. According to the electronic load device, it is possible to control a load condition in such a way that a constant output current Iout equivalent to the overcurrent setting value is output, despite the condition of the output voltage Vout.

Step S83 is a process of making variable a predetermined fixed coefficient K set in a computing program of the target value setting module 32a included in the current control pulse generating means 32, and continuously changing the target value output to the computing module 32b. On making the fixed coefficient K continuously variable, an area in which the output voltage Vout maintains constancy, and an area in which it continuously changes, are produced.

Step S84 is a process of extracting a fixed coefficient boundary value K(lim), which is a boundary point between the heretofore described two areas.

Step S85 is a process of storing the extracted fixed coefficient boundary value K(lim) in the computing program as a setting value of the relevant fixed coefficient.

A description will be given, based on FIGS. 15(a) and 15(b), of an operation of the heretofore described initial setting method of the embodiment. FIG. 15(a) is an example of an overcurrent protection characteristic of the switching power source device 10. When the output current Iout is small, the output voltage Vout is controlled at a predetermined constant value by the error amplification circuit 16. On the output voltage Vout increasing, and reaching the overcurrent setting value, the output current Iout is limited by the current limit signal generating circuit 36, and the output voltage Vout also drops simultaneously. Herein, the change of the fixed coefficient K is the change of the overcurrent setting value. On the fixed coefficient K changing, the target value determined by a target value computing circuit changes, and the reference voltage Vr of the current limit signal generating circuit 36 changes, as a result of which the overcurrent setting value changes. The initial setting method of the embodiment, utilizing the fixed coefficient K, is a method for setting the overcurrent setting value to a desired loop.

In step S81, the switching power source device is placed into the standby condition wherein the output current can be supplied. Next, in step S82, the current setting of the electronic load device is set to the desired overcurrent setting value Iocp. At this time, as the fixed coefficient K is an optional value, it is uncertain what kind of value the output voltage Vout will indicate, as shown in FIG. 15(b).

A computing equation set in the target value setting module can be expressed, for example, as in an equation (6).
[Expression 6]

$$C = f(T_{24}, V_{26}, V_{28}, K) \qquad (6)$$

C is the target value, T24 is the output signal of the temperature detection means 24, V26 is the output signal of the input voltage detection means 26, V28 is the output signal of the output voltage detection means 28, K is the fixed coefficient, and f is a predetermined function which has these as parameters. Although the fixed coefficient K is one which is normally fixed at a predetermined value when using the switching power source device 10, in step S83 the fixed coefficient K is made variable, because of which it is used as means of continuously changing the target value.

On the fixed coefficient K being made continuously variable in step S83, the area in which the output voltage Vout maintains a constant value, and the area in which it continuously changes, are produced, as shown in FIG. 15(b). Then, the process of extracting the fixed coefficient boundary value K (lim), which is the boundary point between the two areas, is carried out.

Then, in step S84, the fixed coefficient K of the computing equation of the target value setting module is fixedly set at the K(lim), and stored. Because of this, the switching power source device 10 overcurrent characteristic is fixed at the characteristic when K=K(lim) shown in FIG. 15(a), and the initial setting is completed.

As heretofore described, according to the initial setting method of the control characteristics of the switching power source device of the embodiment, even in the event that a fluctuation occurs in the overcurrent setting value due to individual differences in the characteristics of the electronic parts configuring the circuits, such as, for example, the inductance value of the transformer T1, the resistance value of the current detecting resistor R0 of the current detecting circuit 38, or the comparison accuracy of the current limit signal generating circuit, it is possible to adjust all of them to the desired overcurrent setting value. At this time, the adjustment being possible with only a software related process, with no need for a troublesome hardware related adjustment operation, such as a part replacement or an adjustment of a semi-fixed resistor, it is also easy to automate.

The invention, not being limited to the heretofore described embodiments, can also be applied to a push-pull type, a bridge type, a flyback type, various kinds of chopper type, and the like.

Also, it is also acceptable to make the current limit operating time monitoring circuit a method of monitoring the output voltage Vout, using the digital processor configuring the current control pulse generating means. It is also acceptable that an A/D converter circuit used in the temperature detection means, input voltage detection means, and output voltage detection means uses a function built into the digital processor. Apart from this, it being sufficient that the computing equations and the like set for each computing process are ones wherein the operational characteristics, properties, and the like, of the relevant switching power source device are appropriately mathematized, it is acceptable that they are any one of a theoretical equation derived from an engineered circuit network analysis, or the like, an experimental equation derived from testing, experimentation, or the like, or an empirical equation, or the like, wherein these are combined with an empirical rule.

Furthermore, with the heretofore described initial setting method, it is acceptable to set a plurality of fixed coefficients K, and carry out a series of steps a plurality of times under differing conditions. For example, it is acceptable to adjust a first fixed coefficient K in an environment of an ambient temperature of 25° C., and adjust a second fixed coefficient K in an environment of an ambient temperature of 50° C., or the like. Also, it is acceptable to carry out an adjustment of the first fixed coefficient K setting the input voltage to a minimum value of an allowable range, and adjust the second fixed coefficient K setting the input voltage to a maximum value of the allowable range, or the like. Because of this, the effects of the individual differences in the characteristics of the electronic parts configuring the circuits are eliminated from various perspectives under differing conditions, and it is possible to cause the overcurrent characteristic of the switching power source device to conform more accurately with the desired characteristic.

The invention claimed is:

1. A switching power source device including a drive pulse generating circuit which outputs a drive pulse whose pulse width is modulated at a predetermined switching frequency, an inverter circuit having a switching element which turns on and off a direct current input voltage in accordance with a drive pulse from the drive pulse generating circuit, generating an alternating current voltage, and a rectification and smoothing circuit which rectifies and smoothes the alternating current voltage, generates an output voltage, and supplies an output current to a load, the switching power source device comprising:

current control pulse generating means configured of a target value setting module which outputs a value which, being a predetermined target value relating to a control of the output current, can be changed, a computing module which carries out a computing process relating to the control of the output current based on the target value, and outputs a result of the computation, and a pulse generating module which generates a current control pulse voltage for controlling the output current based on the computation result;

a current detecting circuit which detects the output current from the rectification and smoothing circuit or a current flowing in the switching element; and a current limit signal generating circuit which, when the current detected by the current detecting circuit exceeds a reference value set based on the output of the current control pulse generating means, outputs a current limit signal for limiting the current, wherein the drive pulse generating circuit, on the current limit signal being output, operates in such a way that an on-duty of the drive pulse driving the switching element stops widening, or becomes narrower.

2. The switching power source device according to claim 1, wherein the current control pulse generating means is configured of a digital processor configured in such a way that the current control pulse voltage can be output as a signal whose pulse width has been modulated, a pulse smoothing circuit which smoothes the current control pulse voltage, generating a smoothed voltage, is connected, the current detecting circuit detects the output current or the current flowing in the switching element, and outputs a current detecting voltage based thereon, the current limit signal generating circuit, having a comparison circuit which compares a reference voltage determined based on the smoothed voltage and the current detecting voltage, outputs the current limit signal when the current detecting voltage exceeds the reference voltage, and the drive pulse generating circuit, on the current limit signal being output, operates in such a way that the on-duty of the drive pulse driving the switching element stops widening, or becomes narrower.

3. The switching power source device according to claim 2, wherein the current limit signal generating circuit includes a first resistor, of which one end is connected to an output of the pulse smoothing circuit, a second resistor, of which one end is connected to the other end of the first resistor, a first NPN transistor, whose collector terminal is connected to the other end of the second resistor, whose base terminal is connected to a midpoint of the first resistor and second resistor, and whose emitter terminal is connected to one end of the current detecting circuit output, a second NPN transistor, whose base terminal is connected to the collector of the first NPN transistor, whose emitter terminal is connected to the other end of the current detecting circuit output, and whose collector terminal is an output of the current limit signal generating circuit, one of the emitter terminals of the first and second NPN transistors is connected to a ground potential, and in the current detecting circuit, when the output current of the rectification and smoothing circuit flows, or when a current flows in the switching element, the current detecting voltage is output in a direction such that the emitter terminal of the second NPN transistor has a lower potential than the emitter terminal of the first NPN transistor.

4. The switching power source device according to claim 2, comprising: current limit operating time monitoring means which, in the event that a condition in which the current limit signal is continuously generated by the current limit signal generating circuit, or repeatedly generated for each switching frequency, continues for a predetermined time or longer, outputs a time expiration signal, wherein the target value setting module of the current control pulse generating means, based on the time expiration signal of the current limit operating time monitoring means, determines the target value in such a way that the current detected by the current detecting circuit is further limited by the current limit signal of the current limit signal generating circuit, and outputs it to the computing module, and the current control pulse voltage computed in the computing module based on the target value is output from the pulse generating module.

5. The switching power source device according to claim 2, wherein the computing module of the current control pulse generating means calculates a time ratio of the current control pulse voltage based on the target value output by the target value setting module, the pulse generating module is configured in such a way as to generate a rectangular wave of a constant frequency having a high level and low level voltage of the time ratio calculated by the computing module, the pulse smoothing circuit includes a resistor of which one end is connected to an output of the current control pulse generating means, and a capacitor connected between the other end of the resistor and a ground, and both end voltages of the capacitor form outputs of the pulse smoothing circuit.

6. The switching power source device according to claim 2, wherein the computing module of the current control pulse generating means calculates the time ratio of the current control pulse voltage based on the target value output by the target value setting module, the pulse generating module is configured in such a way as to alternate between the high level of the time ratio calculated by the computing module and a floating level output condition in a constant cycle, the pulse smoothing circuit includes a resistor of which one end is connected to the output of the current control pulse generating means, a capacitor connected between the other end of the resistor and a ground, and a discharge path connected in parallel to the capacitor, and both end voltages of the capacitor form outputs of the pulse smoothing circuit.

7. The switching power source device according to claim 6, wherein the pulse smoothing circuit includes a first resistor of which one end is connected to the output of the current control pulse generating means, a capacitor connected between the other end of the resistor and a ground, at both ends of which an output voltage of the pulse smoothing circuit is generated, a discharge path connected in parallel to the capacitor, and a series circuit of a diode and second resistor connected so as to be able to cause a current to flow from a contact point of the capacitor and first resistor toward the output of the current control pulse generating means, and the computing module of the current control pulse generating means, on the target value determined based on the operating time expiration signal being given, controls the output condition of the pulse generating module at the low level for a predetermined time, and the voltage of the capacitor of the pulse smoothing circuit is discharged via the series circuit of the diode and second resistor.

8. The switching power source device according to claim 2, comprising an error amplification circuit which compares the output voltage of the switching power source device with a predetermined target value, and outputs an inversely amplified output voltage control signal, wherein the current limit signal generating circuit includes a comparison circuit which compares the reference voltage determined based on the smoothing voltage and the current detecting voltage, and outputs a current limit signal which differs between when the current detecting voltage exceeds the reference voltage and a case other than this, wherein the drive pulse generating circuit includes a sawtooth wave generating circuit, which generates a sawtooth wave voltage driven by the switching frequency, a comparator into whose first input terminal the sawtooth wave voltage is input, which compares the output voltage control signal input into a second input terminal and the sawtooth wave voltage, and outputs a signal which differs between a period in which the sawtooth wave voltage is low and a period other than this, and a signal selection circuit into which the current limit signal is input, and wherein the signal selection circuit carries out an operation of selecting the output signal in such a way that a drive pulse of the time ratio determined based on the current limit signal is output from the drive pulse generating circuit when the current limit signal is continuously generated by the current limit signal generating circuit, or repeatedly generated for each switching frequency, and a drive pulse of the time ratio determined based on the output voltage control signal is output from the drive pulse generating circuit when the current limit signal is not output.

9. The switching power source device according to claim 2, comprising: temperature detecting means which detects an ambient temperature of the switching power source device with a temperature-sensitive element, and outputs a temperature signal based thereon, wherein the target value setting module of the current control pulse generating means determines the target value based on the temperature signal, and outputs the determined target value to the computing module.

10. The switching power source device according to claim 2, comprising: input voltage detecting means which detects an input voltage of the switching power source device, and outputs an input voltage signal based thereon, wherein the target value setting module of the current control pulse generating means determines the target value based on the input voltage signal, and gives the determined target value to the computing module.

11. The switching power source device according to claim 2, comprising: output voltage detecting means which detects an output voltage of the switching power source device, and outputs an output voltage signal based thereon, wherein the target value setting module of the current control pulse generating means determines the target value based on the output voltage signal, and gives the determined target value to the computing module.

12. A switching power source device drive method, the switching power source device including:
- a drive pulse generating circuit which outputs a drive pulse whose pulse width is modulated at a predetermined switching frequency; an inverter circuit having a switching element which turns on and off a direct current input voltage in accordance with a drive pulse from the drive pulse generating circuit, generating an alternating current voltage; a rectification and smoothing circuit which rectifies and smoothes the alternating current voltage, generates an output voltage, and supplies an output current to a load; a target value setting module which outputs a value which, being a predetermined target value relating to a control of the output current, can be changed; a computing module which carries out a computing process relating to the control of the output current based on the target value, and outputs a result of the computation; a pulse generating module which generates a current control pulse voltage for controlling the output current based on the computation result; a current detecting circuit which detects the output current of the rectification and smoothing circuit or a current flowing in the switching element; and a current limit signal generating circuit which, when the current detected by the current detecting circuit exceeds a predetermined reference value set by the current control pulse voltage, outputs a current limit signal for limiting the current, the drive method comprising:

carrying out a power source start-up process which, when first activating a power source, supplies a predetermined direct current voltage to an input of the switching power source device, thus starting it up;

carrying out a load setting process which connects a load to an output, and causes an output current equivalent to a desired overcurrent setting value to be output;

carrying out a target value varying process which continuously changes the target value to be output to the computing module by adjusting a predetermined fixed coefficient set in a computing program of the target value setting module included in the current control pulse generating means;

carrying out a boundary value extraction process which, in a condition in which the output current is in a condition of the overcurrent setting value, extracts a boundary value of the fixed coefficient at a boundary point between a condition in which the output voltage continuously changes in response to the change of the target value, and a condition in which the output voltage is held at a constant value in response to the change of the target value;

carrying out a boundary value storage process which stores the boundary value of the fixed coefficient as a setting value of the fixed coefficient in the computing program;

calculating in the target value setting module a new target value to be output to the computing module, with the setting value of the fixed coefficient stored by the boundary value storage process as a fixed coefficient set in the computing program of the target value setting module, and outputting the new target value to the computing module;

carrying out in the computing module the computing process relating to the control of the output current, based on the new target value, and outputting a result of the computation to the pulse generating module;

the pulse generating module generating a current control pulse voltage for controlling the output current based on the result of the computation;

the current limit signal generating circuit, when the current detected by the current detection circuit exceeds the reference value set based on the current control pulse voltage, outputting a current limit signal for limiting the current; and the drive pulse generating circuit, in accordance with the current limit signal, operating in such a way that an on-duty of the drive pulse stops widening, or becomes narrower.

* * * * *